US008550916B2

(12) United States Patent  (10) Patent No.: US 8,550,916 B2
Raynal  (45) Date of Patent: Oct. 8, 2013

(54) INTERACTIVE GAME SYSTEMS AND METHODS INCLUDING A TRANSCEIVER AND TRANSPONDER RECEPTOR

(75) Inventor: Frederick Raynal, Montreuil sous Bois (FR)

(73) Assignee: Ubisoft Entertainment S.A., Montreuil Sous Bois (FR)

(*) Notice: Subject to any disclaimer, the term of this patent is extended or adjusted under 35 U.S.C. 154(b) by 87 days.

(21) Appl. No.: 12/796,532

(22) Filed: Jun. 8, 2010

(65) Prior Publication Data

US 2011/0300944 A1   Dec. 8, 2011

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .............................................. 463/39; 463/42

(58) Field of Classification Search
USPC ...................................................... 463/39, 42
See application file for complete search history.

(56) References Cited

U.S. PATENT DOCUMENTS

| | | | |
|---|---|---|---|
| 4,177,580 A * | 12/1979 | Marshall et al. | ................ 434/22 |
| 5,354,057 A | 10/1994 | Pruitt et al. | |
| 5,741,185 A | 4/1998 | Kwan et al. | |
| 5,904,621 A | 5/1999 | Small et al. | |
| 5,984,788 A | 11/1999 | Lebensfeld et al. | |
| 6,261,180 B1 | 7/2001 | Lebensfeld et al. | |
| 6,302,796 B1 | 10/2001 | Lebensfeld et al. | |
| 6,634,949 B1 | 10/2003 | Briggs | |
| 6,761,637 B2 | 7/2004 | Weston et al. | |
| 7,331,871 B2 | 2/2008 | Lopez | |
| 7,500,917 B2 | 3/2009 | Barney et al. | |
| 2002/0111201 A1 | 8/2002 | Lang | |
| 2005/0026688 A1* | 2/2005 | Goeben | ........................ 463/36 |
| 2007/0167224 A1 | 7/2007 | Sprogis | |
| 2009/0005140 A1 | 1/2009 | Rose | |

FOREIGN PATENT DOCUMENTS

WO    2009/141751 A1    11/2009

* cited by examiner

*Primary Examiner* — William M. Brewster
(74) *Attorney, Agent, or Firm* — Eric L. Lane; McKenna Long & Aldridge LLP

(57) ABSTRACT

A game system comprises a computer manager system adapted to manage gaming activity of one or more players, a transceiver in operative communication with the computer manager system and one or more transponders or transponder/receptor units in operative communication with the transceiver. Each transponder/receptor unit includes a transponder and a receptor. The transceiver is adapted to enable wireless communication between each transponder or transponder/receptor unit and the computer manager system within a distance that is within a range detectable by said transponder/receptor units and the computer manager system.

11 Claims, 21 Drawing Sheets

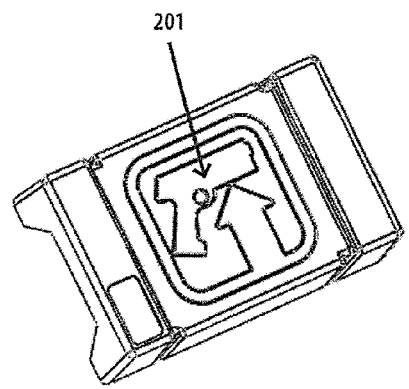
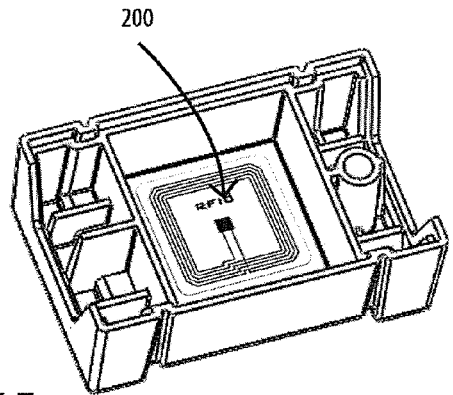
FIG.15
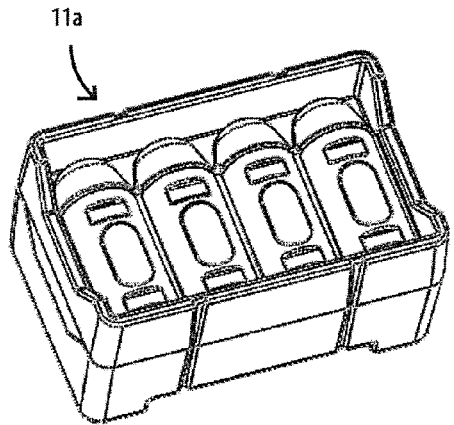
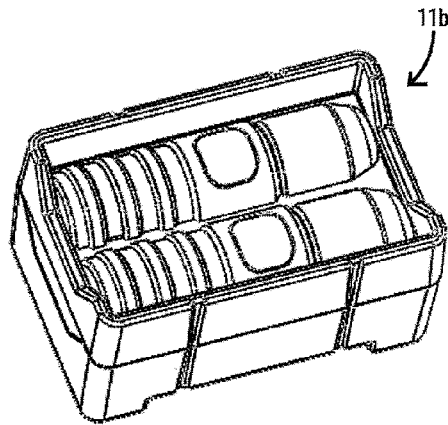
FIG.16      FIG.17
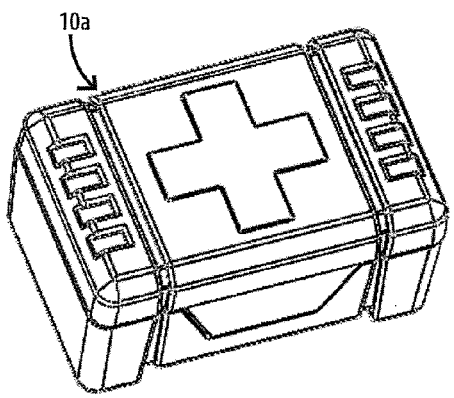
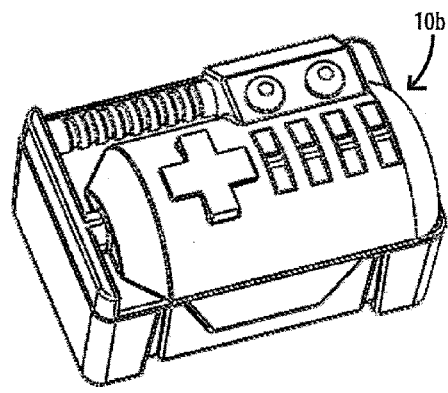
FIG.18      FIG.19

INTERACTIVE GAME SYSTEMS AND METHODS INCLUDING A TRANSCEIVER AND TRANSPONDER RECEPTOR

FIELD OF THE DISCLOSURE

The present disclosure relates to toys and video games.

BACKGROUND

Games such as Laser-tag, Capture the Flag, and other adventure and sports oriented games are known and quite popular. Family entertainment centers, theme parks, play structures and other similar facilities provide play and interaction among play participants playing in, or around an entertainment facility, theme park and/or play structure. Stand alone interactive toys and games such as Laser-tag enable people to play in different environments but lack a means to track and manage gameplay information in real time.

Devices and consoles such as video games, arcade games, hand-held games, personal computers, cell phones and other devices enable individuals or groups of people to interact within very close proximity to the device or console.

However, there is always a demand for more exciting and entertaining games and toys that increase the learning and entertainment opportunities for people and stimulate creativity and imagination in a variety of environments, especially outside of family entertainment centers, theme parks and at dedicated play structure areas. Additionally, device and console based games require the players to play in close proximity to a screen. Stand alone games are limited by their inability to interact with diverse goal-oriented objects that represent any number of rewards, obstacles or other game relevant objects such as life points, medical kits, ammunition, treasures and other goal-oriented objects. In addition, stand alone games lack a centralized game Master or referee that can, in real time, track and manage diverse aspects of each player's activities such as players' scores and success and generate statistics to rank and/or evaluate the game play experience and offer various game play settings and different game play rules.

SUMMARY OF THE DISCLOSURE

Embodiments of the present disclosure address the deficiencies of existing games by providing interactive toys, games and play systems utilizing radio frequency transponders and transceivers, infrared laser beams, and an RFID (Radio Frequency Identification system, wherein all components and game play are managed by a computer system that enables an interactive game play experience in a real environment and can be played both indoors and/or outdoors. Embodiments of a game system's playing area extend up to about 1000 meters from the transceiver and the computer manager system and up to about 100 meters between the transponders. Embodiments of a computer manager system control the activity of the players' transponders or transponder/receptor units during the game play in real time. In particular, the disclosure is directed to an interactive, multiplayer game for use with a computer manager system that acts as a master by guiding or "refereeing" player's transponders in real time during gameplay. Additionally the game comprises RFID-tagged objects for use during gameplay that provide ammunition, life points, medical kits, treasures, and/or other goal-oriented objects to facilitate gameplay.

Embodiments of the disclosure provide unique games and methods of game play carried out without the need of a family entertainment facility, theme park or other dedicated play structure area. The game of the present disclosure enables multiple players to interact in both indoor and/or outdoor setting without the need to play in close proximity to a screen, such as in a typical video game console, handheld game, PC-based game or cell phone-based game context. This unique game also enables players to interact with a variety of goal-oriented objects and offers an objective game master or referee in the form of a computer manager system that tracks players' statistics, game progress and other attributes relevant to the game in real time while the game is being played. Embodiments of a game system comprise a computer manager system adapted to manage gaming activities of one or more players, a transceiver in operative communication with the computer manager system and one or more transponders in operative communication with the transceiver. A corresponding receptor may be provided and together the transponder and corresponding receptor constitute a transponder or a transponder/receptor unit. Transponders can also be in operative communication with each other in order for players to communicate with other players through text, voice or otherwise. The transceiver may comprise one or more of an LED infrared receptor, a radio frequency emitter consisting of a PCB antenna, a PCB with a control circuit and USB wire. The transceiver is adapted to enable wireless communication between each transponder or each transponder/receptor unit and the computer manager system within a distance that is within a range detectable by said transponders or transponder/receptor units and the computer manager system. The computer manager system may manage the gaming activities of the one or more players in real time and may act as one or more of a master of the game and a referee of the game. The game system may further comprise one or more goal-oriented objects, each including a unique identifier and adapted for wireless communication with the one or more transponders. The game utilizes an interactive transponder that can take on a variety of shapes and sizes depending on whether the game is adventure based such as but not limited to laser-tag, capture the flag, kill shot, death match, sword fighting, cops and robbers, cowboys and Indians, pirate games, war games or other single player or multiplayer activity such as sport-based games that can be played indoors or outdoors. The transponder can be combined with a receptor unit that can be carried or harnessed to player(s) to allow one or multiple play participants to electronically interact with accessories, goal-oriented or otherwise, and/or with other players in any inside and/or outside environment to achieve desired goals or produce desired game play experiences within the play environment(s).

In accordance with an exemplary embodiment, the present disclosure provides a transponder consisting of an interactive firing system in the form of a gun or pistol which allows the player to send/receive information from other players and/or goal-oriented objects, other accessories and devices provided by the game through a master computer manager system. Exemplary embodiments provide the player with the ability to fire his transponder which sends information using an infrared beam system comprising an Infrared LED transmitter which sends an infrared coded signal through a concentrating lens. The signal is then read and decoded by an Infrared receiver system mounted on the receptor unit which is coupled to each player's transponder. The transponder also allows players to download information using a Radio Frequency protocol and/or upload information using an RFID reader. The transponder also gives the player the ability to electronically read information using a Head Up Display (HUD) system giving him game relevant information such as objectives, ammunition stock, life points, health and distance to the transceiver among others. The transponder further allows the player through a Radio Frequency protocol and link with the transceiver device system to communicate with the computer manager system. The transponder is configured to allow the player not to have to physically go back to the computer manager or to the computer manager system's screen and read necessary information in order to conduct the interactive game play experience. It also provides the player with audio feedback using an amplification/speaker system. The transponder could also take the form of a cell phone, PDA, smart phone or other handheld communication device that includes one or more of an RF emitter or an RFID reader and has the ability to be retrofitted with an infrared emitter.

In accordance with exemplary embodiments the present disclosure provides a receptor which is wired to a transponder through a Subscriber Identity Module (SIM) connector comprising a body, strapping system, or frame having an accommodating space for housing a PCB with a control circuit and multiple connector-receptacles for receiving conducting terminals. The receptor or harness may comprise a strap system assembled with webbing that holds 1 or more Infrared receiver(s). The receptor unit allows the player through various game play activities to act as a target at which other players fire their transponders. Each player has 1 transponder coupled to a receptor. When one or more player(s) fires their transponder(s) at another player(s), the other player's receptor reacts to the infrared beam sent from the transponders of other player(s) when hit, by displaying flashing LED light(s) that are coupled to the receptor. Thus, the flashing light provides all the players with information telling them when the player they are aiming and firing at has been hit. If the flashing lights do not occur then the player has not been hit. When a player is hit by another player, the hit information is relayed to the player's transponder who was hit via a wire. In order to play in a multiplayer environment with receptors, each receptor must be paired with a transponder at the beginning/setup phase of the game.

In accordance with exemplary embodiments the present disclosure provides an information upload system using an RFID tag system. The system may comprise an RFID reader which is located underneath the transponder's canon and a variety of goal-oriented objects each containing an RFID tag with a unique identifier. The transponder's RFID reader is enabled with the push of a button or switch and can read the unique RFID tag in each goal-oriented object when placed within a distance of approximately 10 cm to the goal-oriented object or when the transponder touches the goal oriented object. This relatively close distance or touching between the transponder and the goal-oriented object gives the player the feeling that he or she has physically engaged with the goal-oriented object(s). The various goal-oriented objects are distributed throughout the play environment to facilitate such interaction. All information collected by the player while playing in such environment is relayed to the computer manager system via wireless communications facilitated by the transceiver device. Each RFID tag is paired with a goal-oriented object and is scanned by each player using his transponder at the beginning of the game play session and is tracked by the computer manager system software. Depending on the game play chosen by the player, each goal-oriented object is given a proposed location away from the computer manager system; the play participants have to dispatch them throughout the play environment before initiating game play, in accordance with the game rules.

In accordance with another embodiment, the present disclosure provides a transceiver system device referred to as "UbiConnect" or a transceiver. The transceiver may be a USB device wired to the computer manager system which is one of a personal computer (PC), a home video game console (Xbox, PS3, Wii, DS . . . ), an arcade game console, a handheld game device, an internet gaming device, a cell phone, a television set, a set top Box, an iPhone or any device with the ability to act as a personal computing system that allows 2D or 3D menus to be displayed on the computer manager's screen and/or on another screen connected to the computer manager system. The transceiver is adapted to enable wireless communication between each transponder or transponder/receptor unit and the computer manager system within a distance that is within a range detectable by said transponders or transponder/receptor units and the computer manager system. More particularly, the transceiver device enables wireless communication between a transponder or transponder/receptor unit and the computer manager system within a distance of up to about 1,000 meters between a transponder or transponder/receptor unit and the computer manager system, with exemplary embodiments enabling wireless communication at a distance of up to about 300 meters. Wireless communication between transponders without using the transceiver is also possible and 2 or more transponders can communicate with each other at a distance of up to about 100 meters from each other. In particular, the transceiver comprises an antenna that relays Radio Frequency information up to about 300 m away from the device in an indoor environment such as a home or apartment containing walls and up to about 1,000 m in a wide environment without any obstacles, such as outdoors in a field or a parking lot. The transceiver uses a specific and unique protocol to communicate between the transponders, receptors and the computer manager system. When players gather at the beginning of game play to scan their accessories (Transponders, Receptors, Goal-Oriented Objects), the computer manager system through a proprietary software application offers various types of game play and options to players.

In accordance with another embodiment the present disclosure provides multiple interactive accessories to be used by a single player or team of players such as: a grenade, a beacon bomb, a movement detector, a target system unit, a mini ammunition clip (that can be held on the player's harness using straps) among others. These interactive accessories communicate with the transponders wirelessly, through infrared beam, RFID tags, or other wireless communication methods or unique identifiers, which are sent to and received by these interactive accessories. These interactive accessories are useful to a player or players to enhance gameplay, practice firing the transponder and improve his or her precision, or speed of reaction time.

For purposes of summarizing the disclosure and the advantages thereof, certain objects and advantages of the disclosure have been described herein above. Of course, it is to be understood that not necessarily all such objects or advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein.

All of these embodiments are intended to be within the scope of the disclosure herein disclosed. These and other embodiments of the present disclosure will become readily apparent to those skilled in the art from the following detailed description of exemplary embodiments having reference to the attached figures, the disclosure not being limited to any particular exemplary embodiment(s) disclosed.

BRIEF DESCRIPTION OF THE DRAWINGS

FIG. 15 is a perspective view of an embodiment of the inside of a goal-oriented object having features and advantages in accordance with the present disclosure.

FIG. 16 is a perspective view of an embodiment of a goal-oriented object having features and advantages in accordance with the present disclosure.

FIG. 17 is a perspective view of an embodiment of a goal-oriented object having features and advantages in accordance with the present disclosure.

FIG. 18 is a perspective view of an embodiment of a goal-oriented object having features and advantages in accordance with the present disclosure.

FIG. 19 is a perspective view of an embodiment of a goal-oriented object having features and advantages in accordance with the present disclosure.

DETAILED DESCRIPTION

A transponder may be a handheld unit comprising one or more of a trigger, button or on/off switch, an Infrared emitter or Beam firing system, a speaker, a Radio Frequency system to connect with other transponder units and/or the transceiver, an RFID reader system, an HUD feedback system, a Force-feedback module system, a sound effects system, a power supply, one or more LED light(s), one of a switch and a button to engage the Infrared emitter, one Of a switch and a button to engage the RFID reader, one of a switch and a button that enables a player to change the readout on the HUD and one of a cable and a wire that connects the game to a player's receptor unit. The transponder can be made out of any convenient commercially available material, including, but not limited to, ABS, rubber or plastic.

A receptor may be an Infrared sensor which is activated when fired upon by a transponder. Numerous receptors are held together on a harness worn by the player. A transponder/receptor unit may comprise a corresponding transponder and receptor used by one player and in operative communication with each other.

A transceiver may be a Radio Frequency system unit comprising a Radio Frequency antenna and Radio Frequency chipset allowing it to send/receive information to/from the transponder(s), an Infrared receptor and a USB connection to connect to the computer manager system.

A computer manager system may be a home console, a cell phone unit, a personal computer system, a smart phone, an iPhone-type device, an iPad-type unit, a TV screen, a setup or set top Box, a portable personal computer system unit and/or any device comprising a screen or a device that can be coupled to a screen, a computer system able to display 2D/3D information on a screen that allows a transceiver to communicate with it through a USB connection.

A goal-oriented object may be any object that provides information relevant to a game and can be located and retrieved by a transponder(s). The goal-oriented objects are adapted to receive and send information or otherwise be in wireless communication with the transponders and may communicate via IR beam, RF communication or may contain an RFID tag inside which communicates with an RFID reader system in the transponder.

Figure 1:
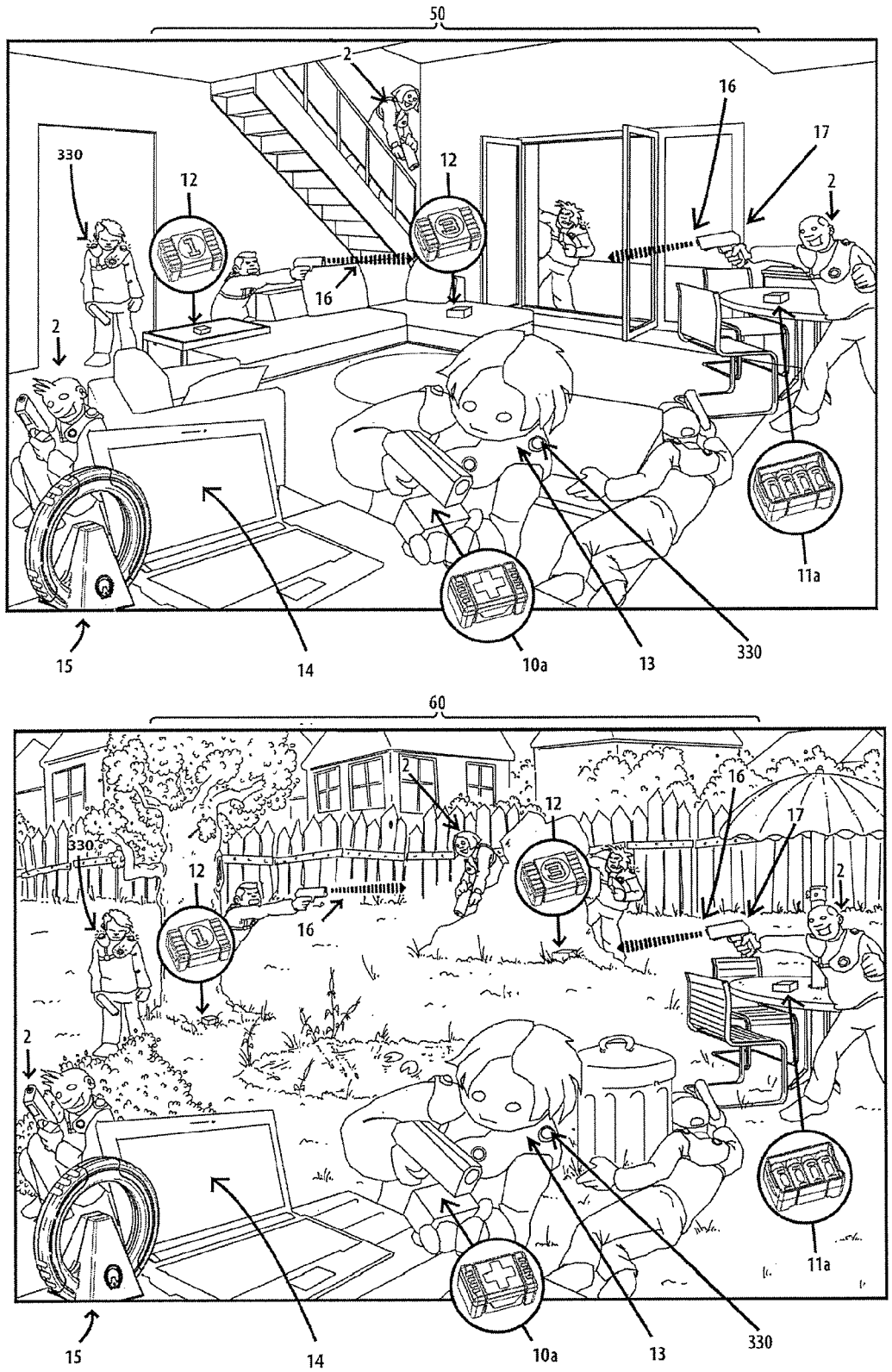
FIG. 1 is a perspective view of a game play session inside and/or outside a real environment using real features and advantages of the environment and showing accessories and devices used by exemplary embodiments of the present disclosure.
Figure 2:
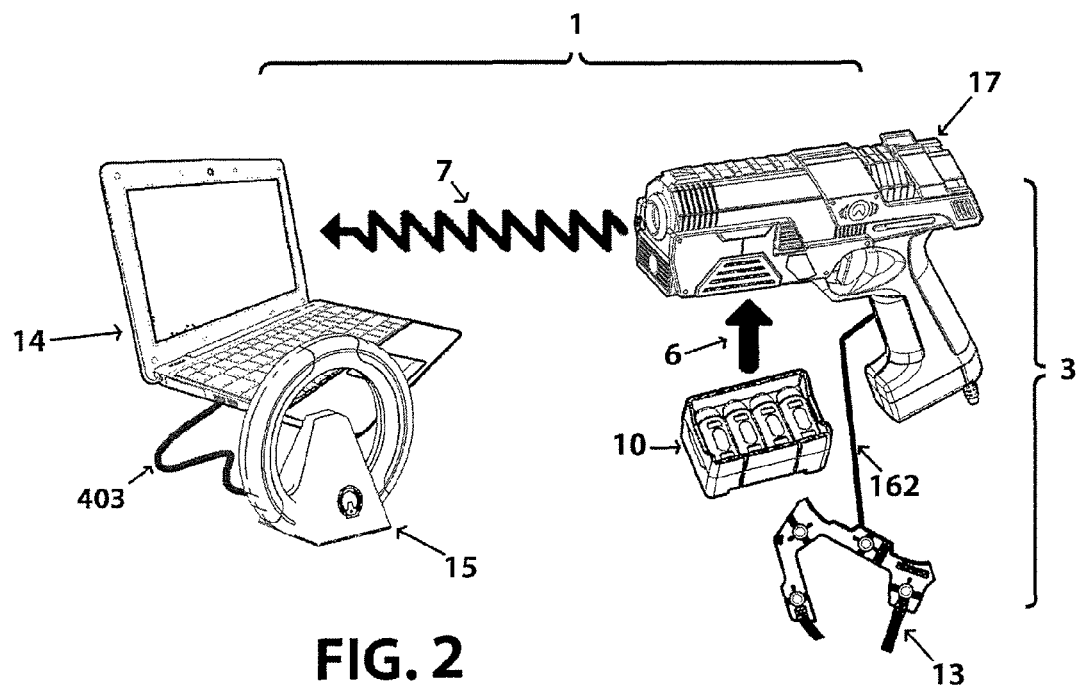
FIG. 2 is a perspective view of an embodiment of a game system having features and advantages in accordance with the present disclosure.

A typical game play session using an embodiment of a disclosed game system is illustrated in FIG. 1. A game may be played with one or more players 2 spread out in the real environment and can be played either in an indoor playing area 50, an outdoor playing area 60, or a combined indoor/outdoor playing area. As shown in FIG. 2, an embodiment of a game system 1 comprises a computer manager system 14 such as a personal computer that is coupled to a transceiver 15. Each player has his or her own transponder or transponder/receptor unit 3. The computer manager system 14 processes information sent to it via a transceiver 15 from the transponders 17 and receptors 13 and acts as a game Master or referee that tracks, in real time, game related information for each player 2 and overall statistical information relating to the game play. The transceiver 15, which is coupled to the computer manager system 14 such that the two components can communicate wirelessly, acts as an intermediary between the transponders 17/receptors 13 and the computer manager system 14 by handling incoming RF and Infrared signals and sending outgoing signals processed by the computer manager system 14 back to the transponders 17/receptors 13 which instruct the transponders 17 to for example to emit an infrared beam 16 again. Each transponder 17 is coupled to a receptor 13, which, in exemplary embodiments can be a harness that registers when a player 2 is hit by the infrared beam 16 tired from other players' transponders 17. The receptor 13 contains at least one light 368 (see FIG. 14), which may be an LED, coupled to the infrared receptor center 330 which flashes when a player is hit by an infrared beam 16 fired from another player's transponder 17. Players 2 can "scan" i.e., retrieve information from goal-oriented objects 12 placed throughout the playing area. Each goal-oriented object 12 contains an RFID (radio frequency identification device) tag 200 (see FIG. 15) that acts as a unique identifier for each goal-oriented object 12. Scanning the goal-oriented objects 12 may result in retrieving life points via medical kit 10a, 10b, reloading ammunition packs 11a, 11b, or acquiring further credit or points in the game by scanning an objective goal-oriented object 12. The scanning of a goal-oriented object 12 might also tell the computer manager system 14 that a game objective has been reached in the process of game play. In this instance, a player 2 may scan a goal-oriented object 12 by touching the goal-oriented object with his or her transponder or by positioning the transponder within a distance of approximately 10 cm from the goal-oriented object. The goal-oriented object 12 scanned by the player's transponder 17 sends information via an RF signal through the transceiver to the computer manager system 14, signaling that the player 2 has completed the task defined in the game rules. Accomplishing this objective, results in allowing the player 2 to score points, which are tallied by the computer manager system 14.

At the beginning of a new game, players 2 gather around the computer manager system 14 or the screen coupled to the computer manager system to choose game play options. The screen displays various menus and prompts the players 2 to make choices about the number of players, the game play mode as is typical in video games. The computer manager system 14 first runs a check on the accessories the players 2 wish to use by asking the players 2 to connect the transceiver 15 or "UbiConnect" to the computer manager 14. Upon connecting the transceiver 15 to the computer manager system 14, the transceiver 15 automatically sends a signal to all of the transponders 17 so that they have been switched on. Each transponder 17 is then given a unique identification number corresponding to a particular player's profile. Each player 2 can then customize his profile by giving it a name and choosing an icon to represent him during the session. Players 2 can also customize various other features such as the sound their transponder 17 makes when it is fired. This player-created profile is used to track the scoring or goals achieved for each player 2. The computer manager system 14 then asks each player 2 to scan the goal-oriented objects 12 to be used in the game. Games can require as few as 0 goal-oriented objects to as many goal-oriented objects as might be needed for any particular game. Players 2 then read the rules of a selected game which are displayed on the screen and dispatch as many goal-oriented objects 12 as required by the game rules in the particular environment. The computer manager system 14 sends a numeric countdown to the screen and to the all of the transponders being used in the game. The transponders 17 emit a sound corresponding to the countdown and a numeric countdown is also displayed on the HUD of the transponder while players 2 position themselves in the play environment according to game's rules. At the GO order, the computer manager system 14 activates all transponders or transponder/receptor units 3 and the game starts. Players 2 then run, hide, fire, interact, engage, or scan any of the goal-oriented objects 12 selected for the game when needed or required in order to achieve the objectives of the game.

Depending on the rules of a particular game, the session is declared ended when predetermined scores are reached, and/or objectives are completed, and/or time has run out. Players can then gather around the computer manager system's screen or the screen coupled to the computer manager which displays their scores, hit statistics, ability or failure to accomplish goals, speed to play, among other game relevant information on the screen. Each player's profile is then updated and stored locally or/and can be sent online to a web manager system in order to keep track of their achievements in the future. Then they can start again to choose and play another game.

Figure 4:
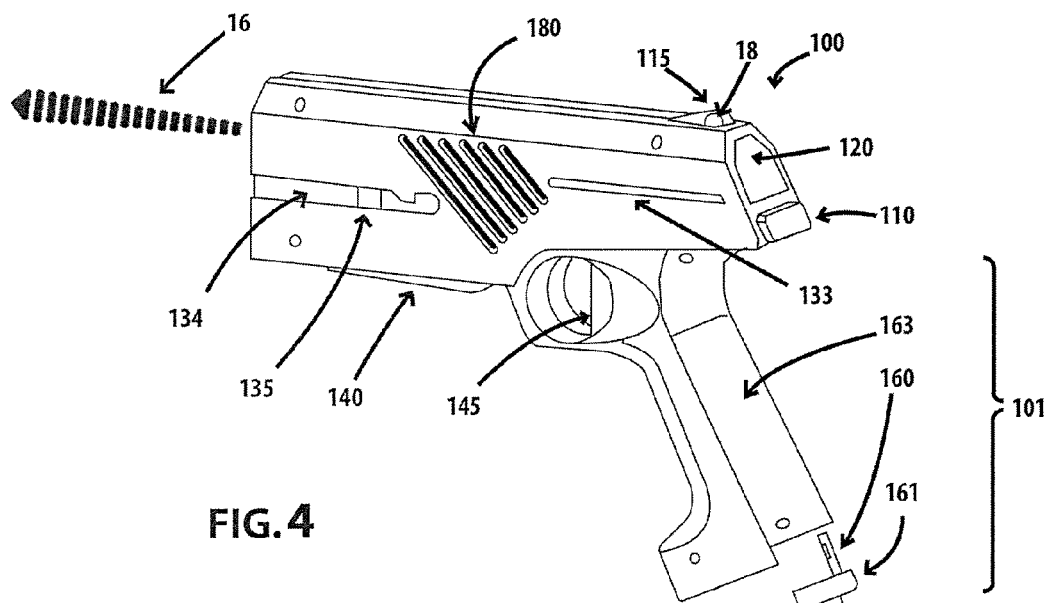
FIG. 4 is a perspective view of an embodiment of a transponder having features and advantages in accordance with the present disclosure.

An embodiment of a hand held transponder is depicted in FIG. 4. The transponder could be in a variety of shapes such as a gun, pistol, machine gun, rifle, wand, sword, stick, baton, knife, or other shape including a cell phone, PDA, Smart phone, other handheld communication device that includes one or more of an RF emitter or an RFID reader and has the ability to be retrofitted with an infrared emitter. In addition, the transponder could take the form of sporting equipment for various sports games, including but not limited to, a baseball bat, a lacrosse stick, a hockey stick, a tennis racket or a ping pong paddle.

Figure 6:
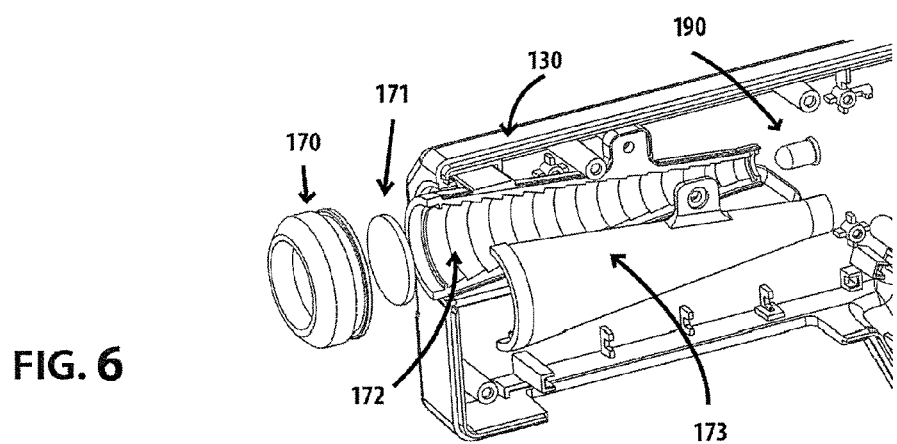
FIG. 6 is an exploded view of an embodiment of an infrared optical system of transponder having features and advantages in accordance with the present disclosure.
Figure 7:
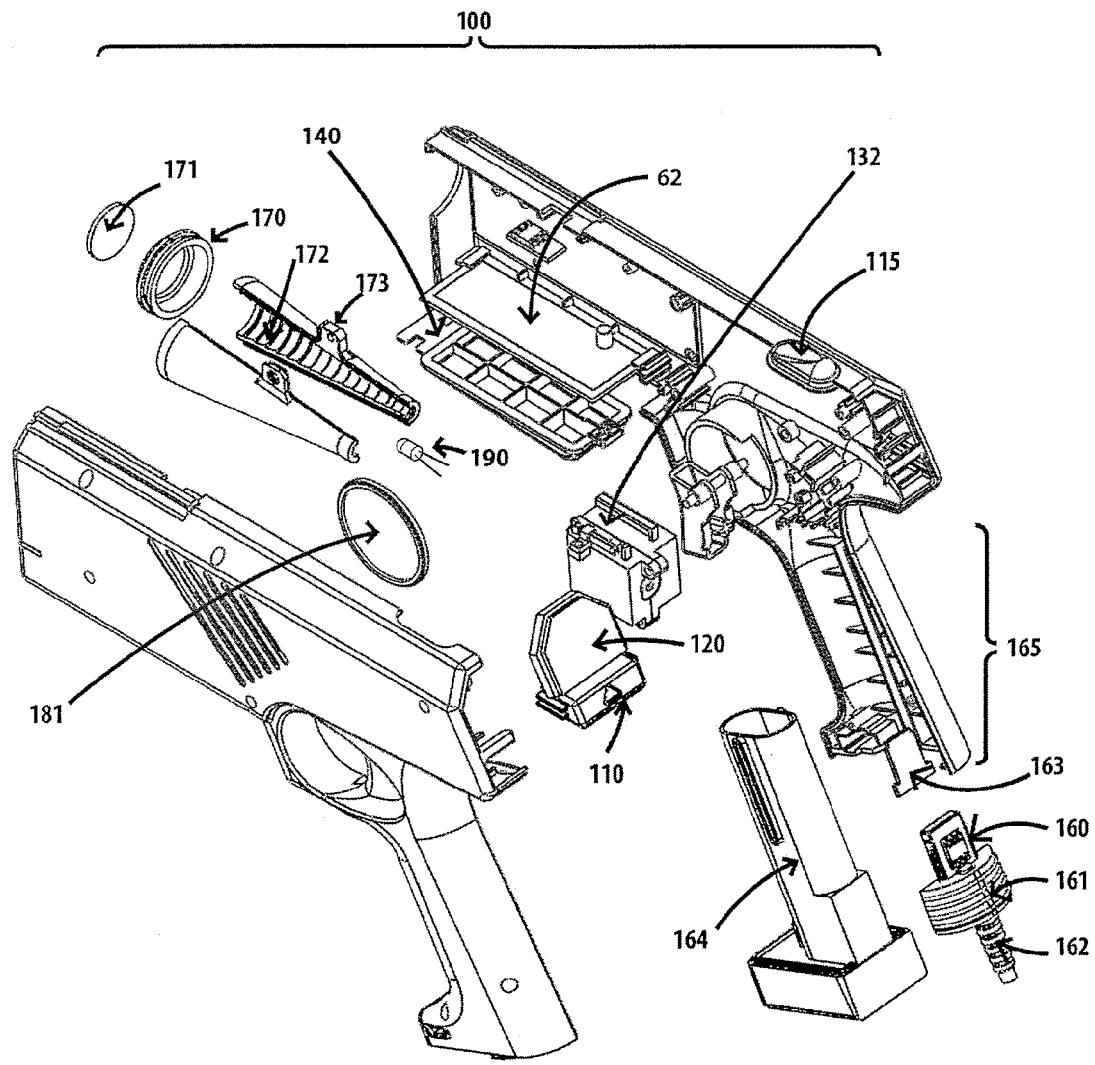
FIG. 7 is an exploded view of an embodiment of a transponder having features and advantages in accordance with the present disclosure.

An exemplary embodiment is in the shape of a Gun 100. The handle 101 of the exemplified transponder may be made of materials such as ABS and rubber or plastic, while the remaining transponder housing is made of a moldable material such as ABS tinted plastic. The transponder housing provides on the top part 130 (See FIG. 6) and side parts 134 attachment points to hold a shell which is shown in detail in FIG. 7, which is fixed on the side of the transponder and connected mechanically and electronically via a SIM (Subscriber Identity Module) connector 135. This shell can come in a variety of shapes and colors and has a unique ID that enables the computer manager system to identify specific attributes of the shell such as the firing distance, ammunition load capacity, firing spread, firing speed which affects the transponder's performance including the players means of firing at other players. Three (3) buttons provide input to the transponder device: the trigger button 145, the HUD button 110 and the RFID button 140. The trigger button 145 initiates the firing sequence during game play. It allows the player to shoot at another player, which is based on the transponder's ammunition capacity.

The computer manager system 14 defines and regulates ammunition levels and provides the ability for the transponder 17 to be fired. The transponder 17 contains an RFID reader 62 to receive signals from, e.g., goal-oriented objects 12. The transponder 17 further comprises a Head Up Display (HUD) 120 which provides visual feedback of the game status, information, and objectives. The HUD button 110 enables the player to display information changes during game play based on signals received from the computer manager system 14. A player 2 can select which information he wants to be displayed on the HUD, such as ammunition count, game objectives status, level of battery life, distance to the transceiver 15, as well as other game and transponder-related information. The transponder has an internal cavity 165 which contains the power supply in the form of a battery pack that can hold 4 AA or rechargeable batteries. The batteries provide power to the transponder and the receptor 13 shown in FIG. 13.

The receptor 13 (see FIGS. 3, 4 and 13) is coupled to the transponder 17, either via a wireless communication system or by a cable or a wire 162 or other physical connection mechanism located at the bottom of the battery pack. The battery pack powers the interaction Light Emitting Diode (LED) 115 that flashes each time a player's receptor 13 has been hit by another player's transponder; the Infrared beam 16 which is generated by the infrared emitter 190 and focused through the lens 171 and concentrated through the cone 172 (see FIG. 6) and/or the sound effects system emitted through a speaker 180; and/or long-range transmissions such as via an infrared LED transmitter device 185 or an RE emitter device 186. This battery pack may be disconnected or reconnected from/to the transponder 17 by pressing button 151 (Sec FIG. 5). The SIM like proprietary designed connector 160 allows the player to connect/disconnect the transponder to/from the receptor. The player can also power ON/OFF the transponder and receptor using a button or switch underneath the bottom part of the transponder handle 150. At the bottom of the firing section of the transponder is an RFID reader that is operable through a button 140. The RFID reader provides relatively short-range RE communication and is used in conjunction with the goal-oriented objects that each contain a unique MD tag 202 shown in FIGS. 15, 16, 17, 18, 19, and 20. When the RFID button 140 is pressed on the transponder, it turns ON the RFID reader which reads the RFID tag 200 in the goal-oriented object 12 as soon as the transponder 17 touches or comes within a range of approximately 10 cm of the goal-oriented object 12. Although this exemplary embodiment includes a range of approximately 10 cm between the transponder and the goal-oriented object(s) for the RFID reader to identify the RFID tag, other games and embodiments considered by the inventor could incorporate a greater distance of approximately 1 meter between the transponder and the goal-oriented object(s) for the RFID reader to identify the RFID tag in the goal-oriented object(s). The transponder 17 also emits an infrared or a laser beam like signal through a lens 171 (See FIG. 6). An orange circular part which can be seen while playing the game by non-players 170 encapsulates the lens in order to follow applicable regulations on replica weapons to clearly identify the Gun as a toy.

Figure 3:
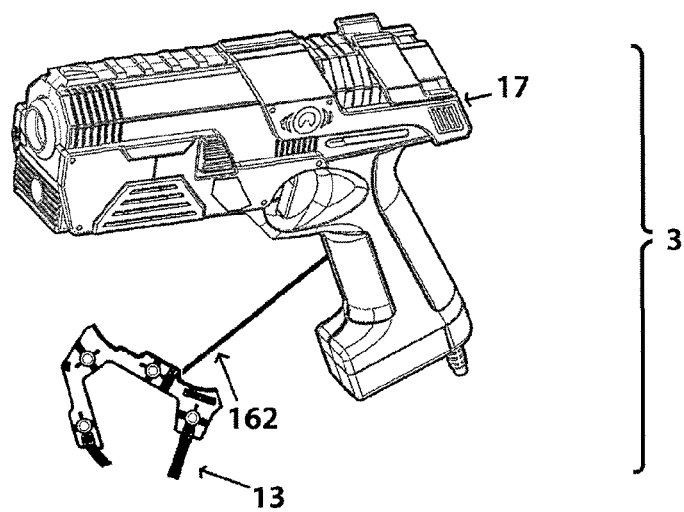
FIG. 3 is a perspective view of the connection between an embodiment of a transponder and an embodiment of a harness having features and advantages in accordance with the present disclosure.
Figure 5:
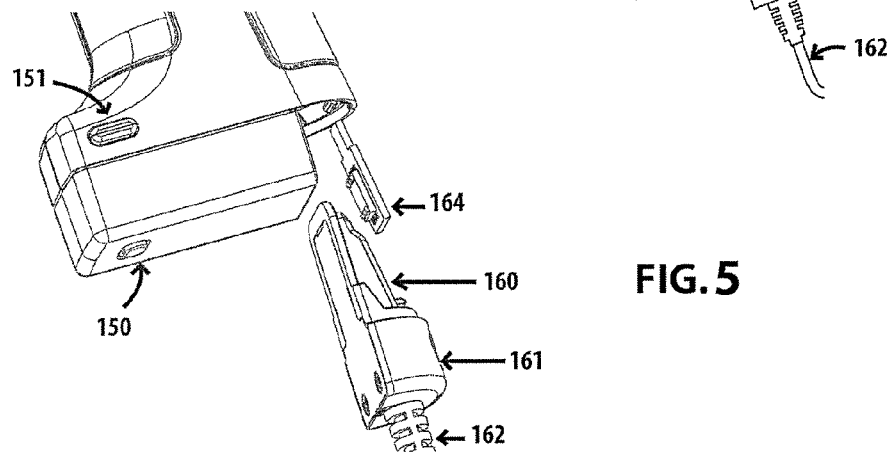
FIG. 5 is an exploded view of an embodiment of the connection details between a transponder and harness having features and advantages in accordance with the present disclosure.
Figure 13:
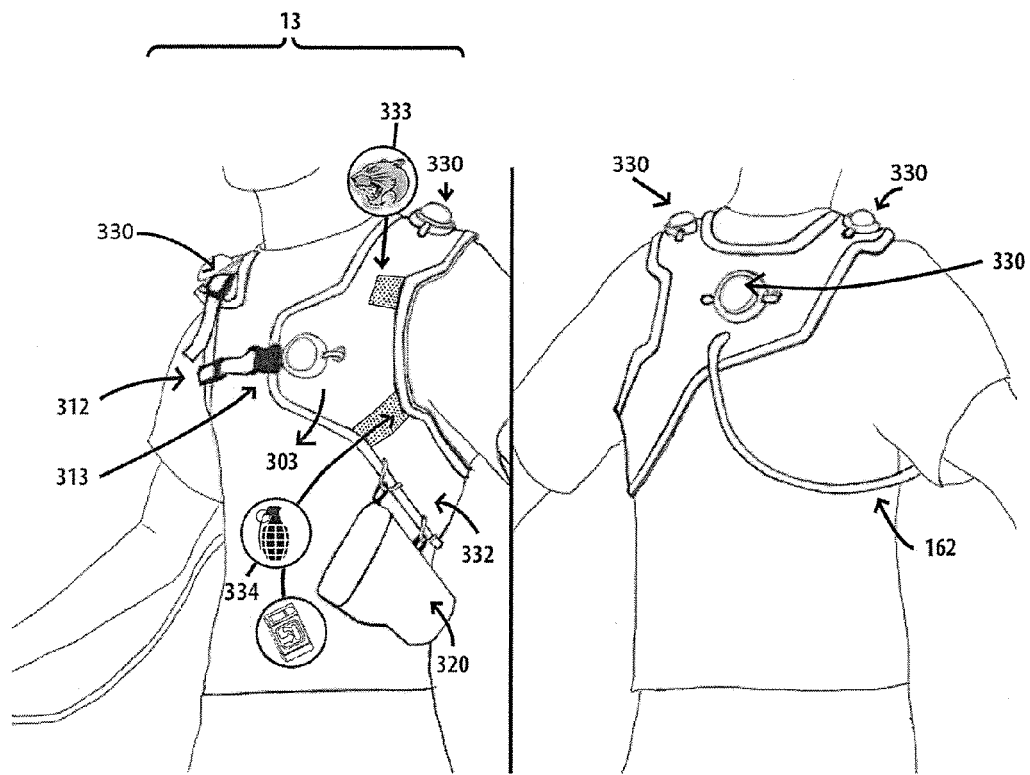
FIG. 13 is a perspective view of an embodiment of a receptor having features and advantages in accordance with the present disclosure.

An exemplary embodiment of a connection between the receptor 13 and the transponder 17 is illustrated in FIGS. 3, 5 and 13. The connection comprises wire or cable 162 which sends coded information to the transponder 17 when the player's receptor 13 is hit by activation by another player's transponder 17. The wire or cable 162 also sends coded information to the LED light(s) on the receptor when the player's receptor is hit by another player's transponder resulting in the LED light(s) turning on. The plug parts 161 and 160 allow a SIM connection with the transponder 17. An exemplary embodiment of the transponder's infrared emitter 190 or optical device system is detailed in FIG. 6. The infrared optical device system concentrates the infrared beam 16 fired by the transponder 17. It is positioned at the head (canon) of the transponder 17 and comprises a cone made of ABS 173 with particular shape made to conduct the light and avoid degradation of such concentrated light from the Infrared emitter 190 towards a plastic lens 171 that focuses the light in a beam which can then hit another player's receptor 13 within a range of approximately 100 meters.

Figure 8:
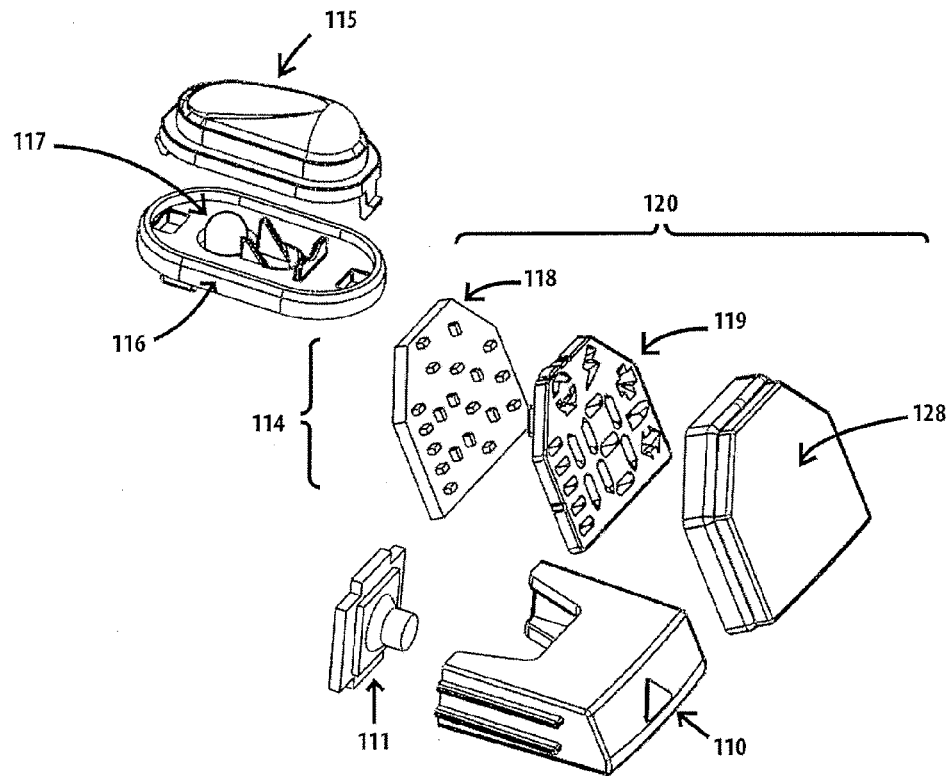
FIG. 8 is an exploded view of an embodiment of the Head up Display (HUD) and the LED of a transponder having features and advantages in accordance with the present disclosure.
Figure 9:
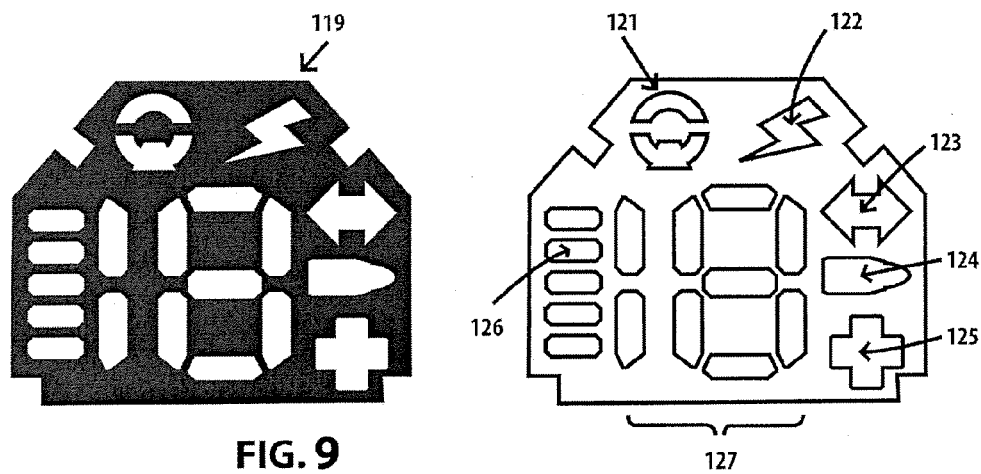
FIG. 9 are front views of embodiments of feedback icons of the HUD of a transponder having features and advantages in accordance with the present disclosure.

The transponder's Head Up Display ("HUD") 120 is illustrated in FIGS. 8 and 9. The HUD shows several icons that give information and status information of the current game or activity. One exemplary embodiment is specifically detailed and includes the HUD layout, icons and functionalities. The HUD is illuminated through an LED system which comprises 21 LEDs 114 mounted on a PCB 118 which provides illumination that is then driven through a guiding grid or a Light Guide 119 and expanded through the window screen 128 which includes a diffusing material which concentrates the light beam and allows the icons to be retro lit effectively so the player can easily view the HUD 120. The diffusing material may be composed of small bits of reflective material spread in the ABS or other plastic component used. Elements 115 and 116 depict the hit feedback system capsule in which a bicolor red/green LED 117 is held. Each time the player's receptor is hit by another player's transponder, the LED 117 flashes giving necessary feedback to the player.

The HUD display shows several icons 121, 122, 123, 124, 125, 126 that give information and status information of the current game or activity. The icons represented in one embodiment on the HUD 120 are illustrated in FIG. 1F. The HUD can be illuminated each time the player needs to know information. The UbiConnect icon 121 illuminates each time the player needs to go back to the transceiver 15 and/or is out of range. The medikit icon, a red cross 125 illuminates each time the player runs out of ammunition and/or illuminates to indicate how many life points the player has left. The power icon designed as a lightning strike 122 illuminates in conjunction with the vertical bar 126 when the player's battery supply is low. This indicates to the player that it is necessary to go back to where the transceiver 15 is located to recharge his transponder to continue game play. A bullet icon 124 illuminates in conjunction with the horizontal bars 126 to indicate how much ammunition, e.g., the number of bullets, are left in the transponder. Each time the player fires, the ammunition level decreases. The score or a timer or objectives value is displayed through 127. The Goal icon is designed as a double arrow 123 that illuminates in conjunction with the timer 127 indicating to the player number of bases or objects he or she has to reach or any other information related to an objective to be completed during game play. The HUD button 110 allows the player to navigate through each of the aforementioned features.

FIGS. 4, 5, 6 and 7 illustrate details of a transponder 17, in particular an exemplary embodiment taking the form of a gun. The details include the inside of the MD reader 62, the transponder's Infrared emitter 190, the battery pack 164, the wire electrical connection with receptor unit 162, the HUD 120, and the speaker 181.

Figure 10:
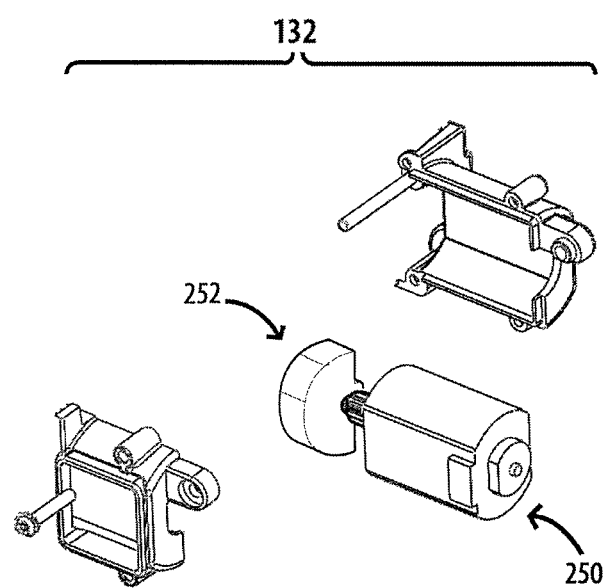
FIG. 10 is an exploded view of an embodiment of the force feedback module system of a transponder having features and advantages in accordance with the present disclosure.

FIG. 10 illustrates an exemplary embodiment of a force feedback system 132 of the transponder 100 (see FIG. 7) which can provide force feedback during game play. The force feedback system comprises a masselote 252 which is a small heavy part at the bottom of the moving shaft moved by the engine and made of metal. The masselotte is fixed on a rotating axis powered by a DC Motor 250 inside on the shell of the gun 100 thus sending vibrations to the gun 100 and then to the player's hand which is holding the gun 100, allowing the player to feel a vibration indicating that he has been hit. Each time the player is hit, the transceiver sends a signal to the transponder to activate the force feedback system thus activating the vibration.

Figure 11:
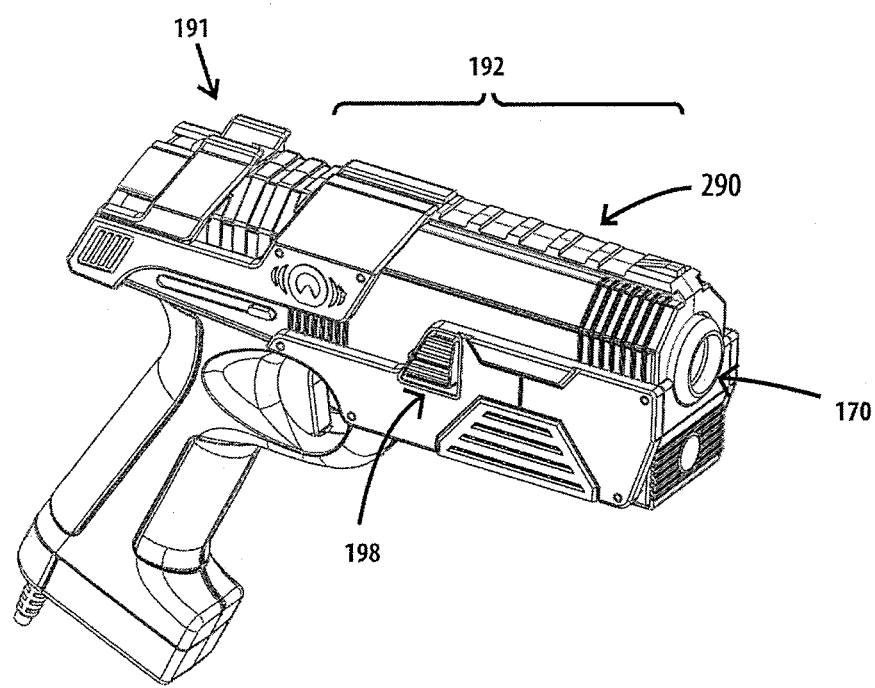
FIG. 11 is a perspective view of an embodiment of a shell of a transponder having features and advantages in accordance with the present disclosure.

FIG. 11 illustrates the transponder housing 192 in Gun form which is clipped in a rack comprising small dents 290 shaped on the shell of the gun to the Gun. The gun sight 191 allows the player to aim more accurately. A button on the side of the gun 198 allows the player to unclip the shell from the Gun therefore changing the ammunition or shell thereby customizing the Gun to the player's own taste. Even with the shell mounted the Gun the orange circular portion 170 of the gun is visible to other players on non players.

Figure 12:
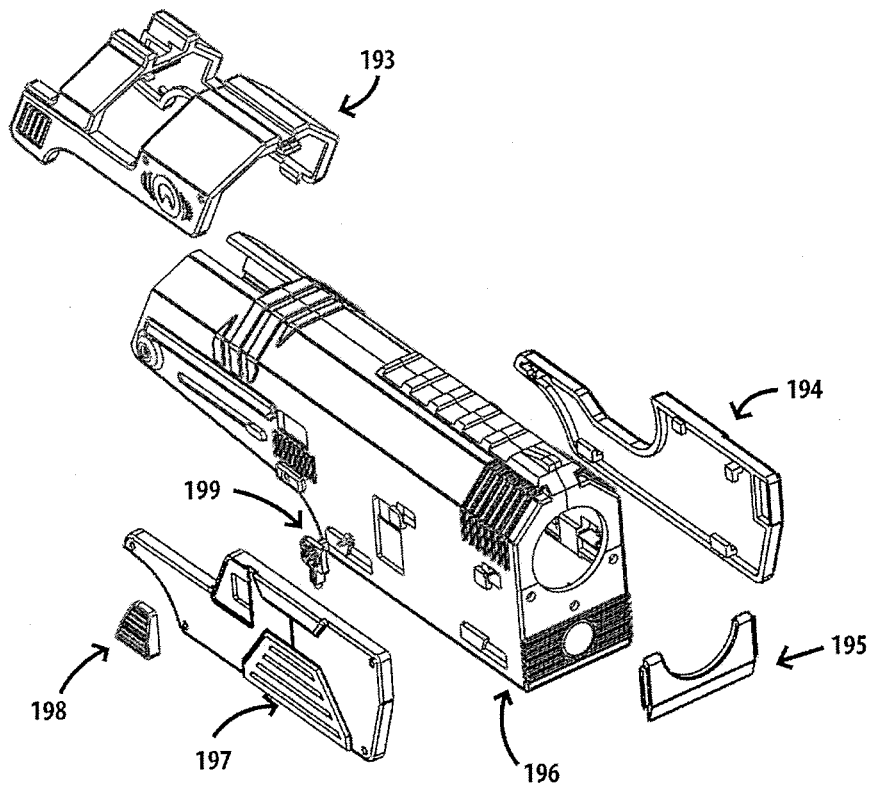
FIG. 12 is a perspective view of an embodiment of a shell assembly of a transponder having features and advantages in accordance with the present disclosure.

FIG. 12 illustrates 5 parts of the shell 193, 194, 195, 196 and 197 of the Gun which are clipped together in one piece. Buttons 198 and 199 allow the player to dismount the shell from the body part of the Gun allowing him to change shells, therefore customizing the gun differently, depending on each player's preferences. Each shell has a unique ID which can then tell the computer manager system what sounds it needs to play when a transponder is fired.

Figure 14:
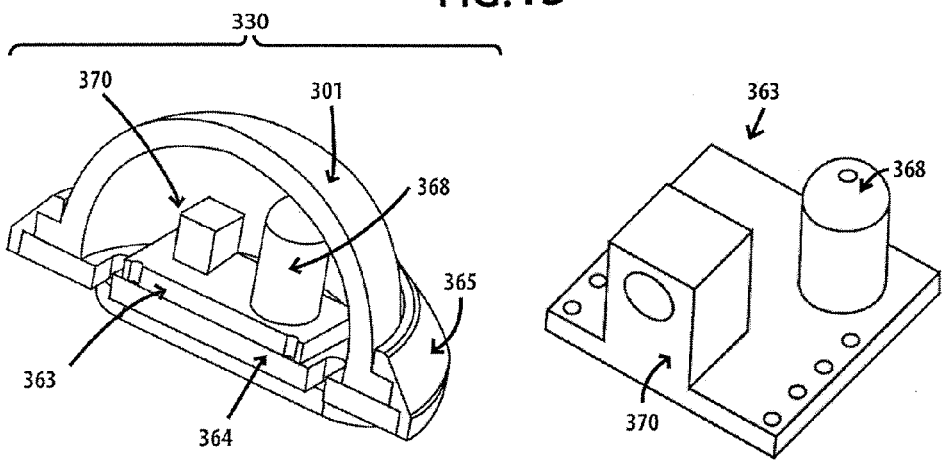
FIG. 14 is a perspective view of an embodiment of an infrared receptor center having features and advantages in accordance with the present disclosure.

An exemplary embodiment of receptor 13 of the game system is illustrated in FIGS. 13 and 14. Receptor 13 may be in the form of a harness, which comprises one or more infrared receptor centers 330. The receptor depicted in FIG. 13 consists of 4 infrared receptor centers 330 (one on each shoulder, one in the hack and one on the plexus). Each of the infrared receptor centers 330 contains at least one infrared receptor 363 and at least one light 368, which may be an LED, though each infrared receptor center 330 could contain multiple infrared receptors 363 or lights 368. The harness can be made of any suitable flexible material such as cloth, leather or other material 303 and contains wires embedded in the harness material that connect to each receptor. The harness is adaptable for small or large size individuals through a strap system 310 and 312 which allows adjustment for fit based on a player's safety and comfort. The harness may comprise one or more different attachment points that allow a player to customize its look and attach accessories, including, but not limited to, a holster 320, grenades or mini clips 334, and/or an ID badge 333.

Each receptor's internal construction is illustrated in FIG. 14. It is made of a small tinted plastic container 301, clipped on the cloth 364 with an ABS circular part 365. On the PCB 363 adjacent to the infrared LED receptor 370 is a flash LED light 368 which flashes each time the player has been hit.

Representative RFID tag items 200 or goal-oriented objects 12 bottom and inner sections are illustrated in FIGS. 15, 16, 17, 18, 19 and 20. Exemplary embodiments provide a variety of goal-oriented objects 12 that are made of plastic or other suitable material. Each goal-oriented object 12 comprises a plastic colored and shaped substrate having two sides (front and hack) that are coupled together to form a goal-oriented object 12. The front side of each goal-oriented object 12 is shaped in the look of the function of an object relevant to an adventure, sports or other interactive game. Goal-oriented objects 12 can be fashioned to look like a medical or first aid kit such as depicted in FIG. 18 or 19, an ammunition pack as depicted in FIG. 16 or 17, or another objective goal-oriented object such as those depicted in FIG. 20. These generic goal-oriented objects can be associated with a variety of objects relevant to game play such as a treasure chest, a flag, or another item that would be typically important in an adventure, sports or other interactive game. Each goal-oriented object 12a, 12h, 12c, 12d is designed with the desired colors and features and may be imprinted with graphics, carved in a particular shape (such as a cross for a medical kit) or in the shape of a treasure chest or any other configuration desired. Each goal-oriented object 12a, 12b, 12c, 12d may include any number of designs or information pertinent to its application. The inside of each goal-oriented object comprises a radio frequency identification tag 200 pre-programmed with a specific identifier for each of the goal-oriented objects 12a, 12b, 12c, 12d. The specific identifier is used to identify and track such individual goal-oriented object 12a, 12b, 12c, 12d within the play environment. The hack side of each goal-oriented object contains an icon, logo, or image 201 featuring an action the player has to conduct to contact the item.

Representative RFID goal-oriented objects in the form of ammunition packs 11 are illustrated in FIGS. 16 and 17. The goal-oriented objects may be distributed throughout the playing area. When low or out of ammunition, the player's transponder 17 can touch or be within a range of approximately 10 cm from one of the goal-oriented objects 12 and then engage the RFID reader The RFID reader scans the tag and reloads the transponder 17 or applies additional ammunition to the player 2 giving the player the feeling that he or she has inserted an ammunition cartridge into the transponder.

FIGS. 18 and 19 illustrate the medical or first aid kit 10 goal-oriented object. The RFID tagged items may be distributed throughout the playing area. When low or out of life points a player can scan the RFID tagged items from the playing area in order to reload. Two (2) different designs for these objects are illustrated in FIGS. 18 and 19.

Figure 20:
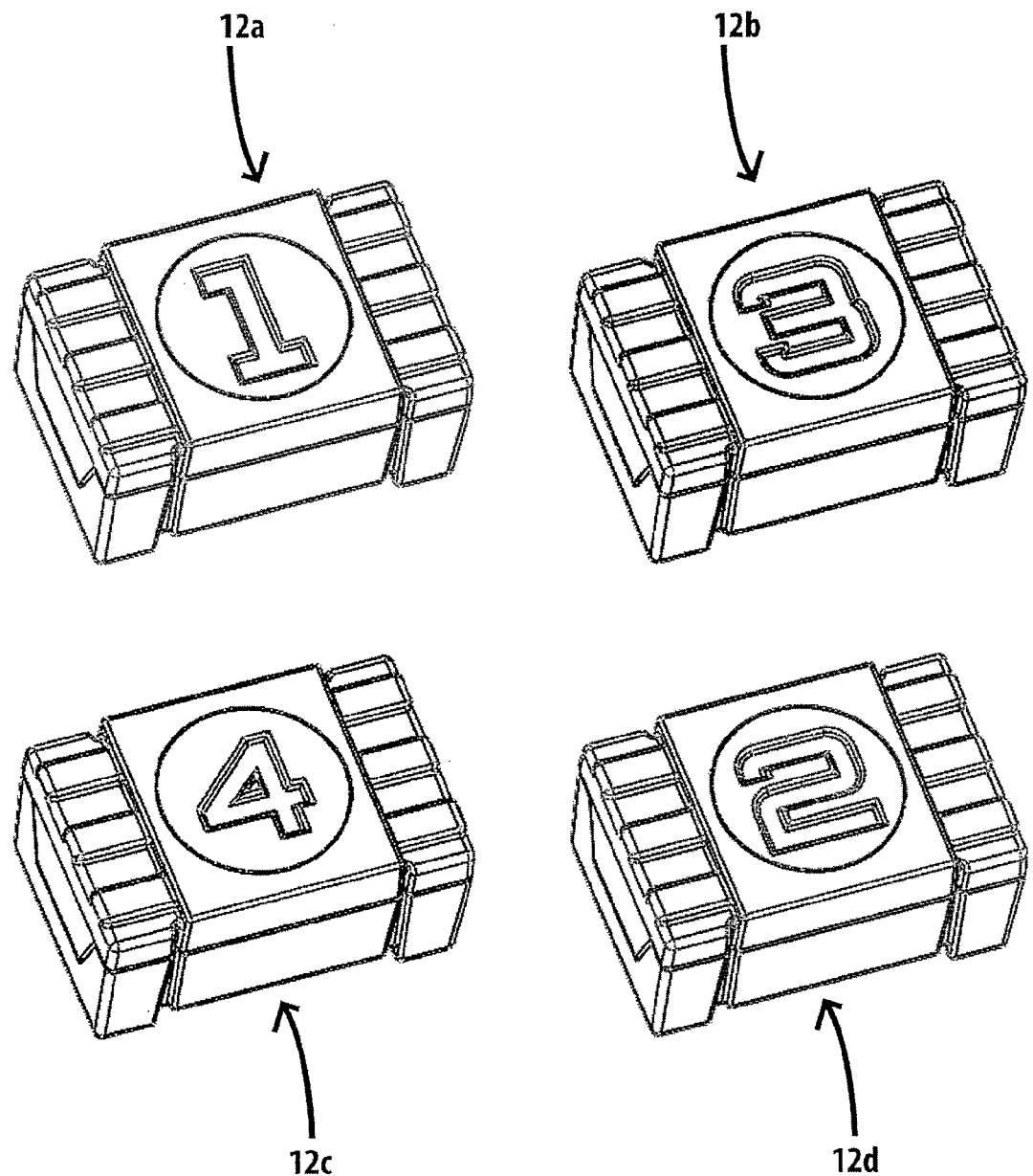
FIG. 20 is a perspective view of embodiments of goal-oriented objects having features and advantages in accordance with the present disclosure.

One possible configuration for the objective goal-oriented objects 12a, 12b, 12c, and 12d, illustrated in FIG. 20, could be in accordance with game play rules or orders provided by the computer manager system in which a player 2 may be required to collect (i.e., scan) one or more of these items in a prescribed sequence in the playing area in order to fulfill the game play sequence. There may be defined periods during game play that require collecting these objects. Objects in these packs may be distinguished from one another based on size, color, number or any other identifying indicators.

Figure 21:
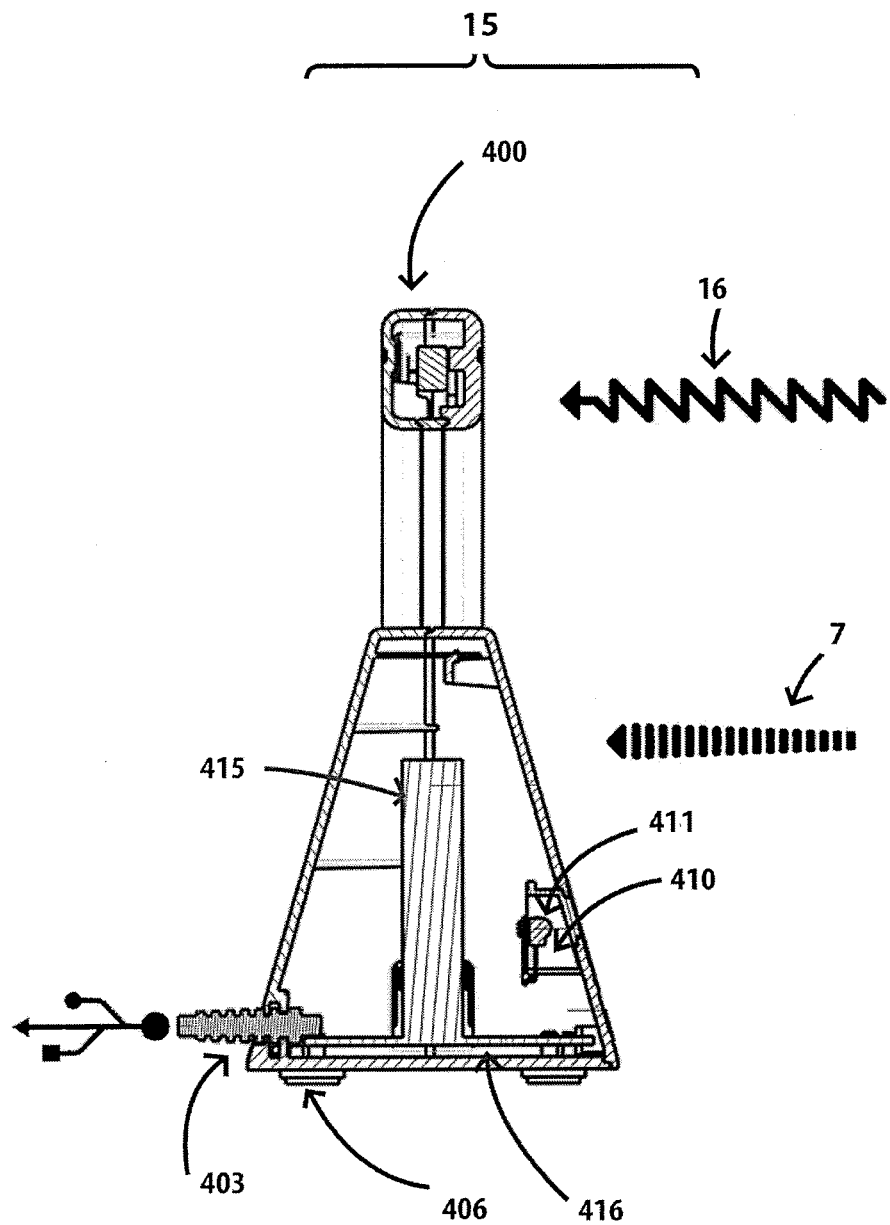
FIG. 21 is a side cross-sectional view of an embodiment of a transceiver having features and advantages in accordance with the present disclosure.
Figure 22:
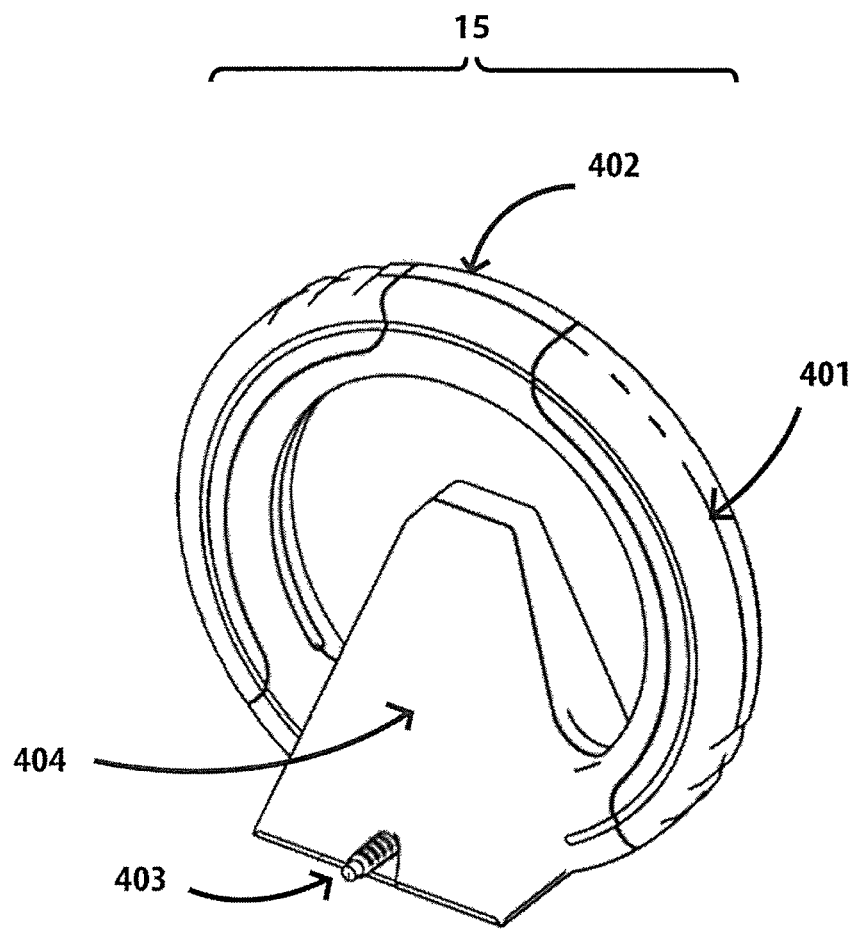
FIG. 22 is a rear perspective view of an embodiment of a transceiver having features and advantages in accordance with the present disclosure.
Figure 23:
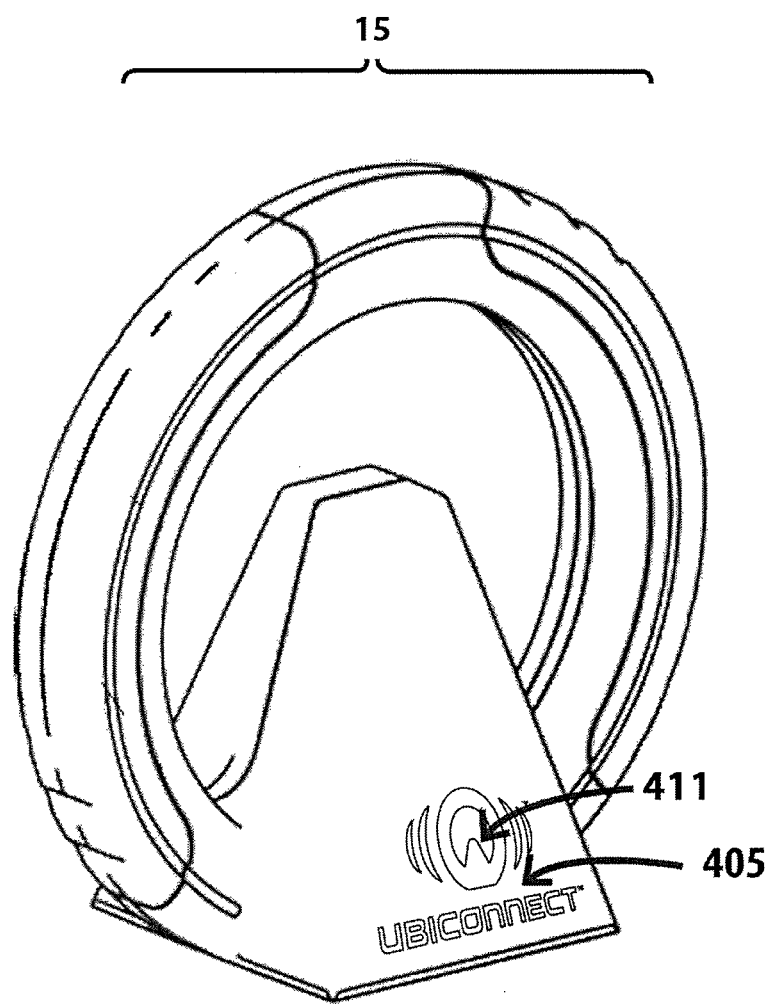
FIG. 23 is a front perspective view of an embodiment of a transceiver having features and advantages in accordance with the present disclosure.

An embodiment of a game system transceiver 15 is illustrated in FIGS. 21, 22 and 23. The transceiver 15 comprises an infrared receptor 410 and a high density LED 411, a Radio Frequency emitter consisting of a PCB antenna 415, a PCB card with a control circuit 416 including an RF chipset, and a USB wire 403 from which the transceiver 15 gets its electrical energy and communicates with the computer manager system 14, such as a personal computer, a computer gaming platform, home game console, arcade game console, hand-held game device, internet gaming device, a cell phone, a television set, or a setup box. The "UbiConnect" or transceiver 15 enables the player's transponders 17 to communicate wirelessly (through RE signal 7) with the computer manager system 14 with which it is wired through a USB cable 403. The transceiver 15 may also be coupled to the computer manager system 14 through a wireless connection or another wireless protocol such as Blue Tooth, WIFI or others. In exemplary embodiments players can tire a transponder 17 directly at the transceiver 15. The transceiver will analyze the IR signal 16 using the infrared receptor 410 to determine which transponder has fired at it. Thus the transceiver acts as a receptor which can accept shots from several players and through the computer manager determine which transponder shot first.

Figure 24:
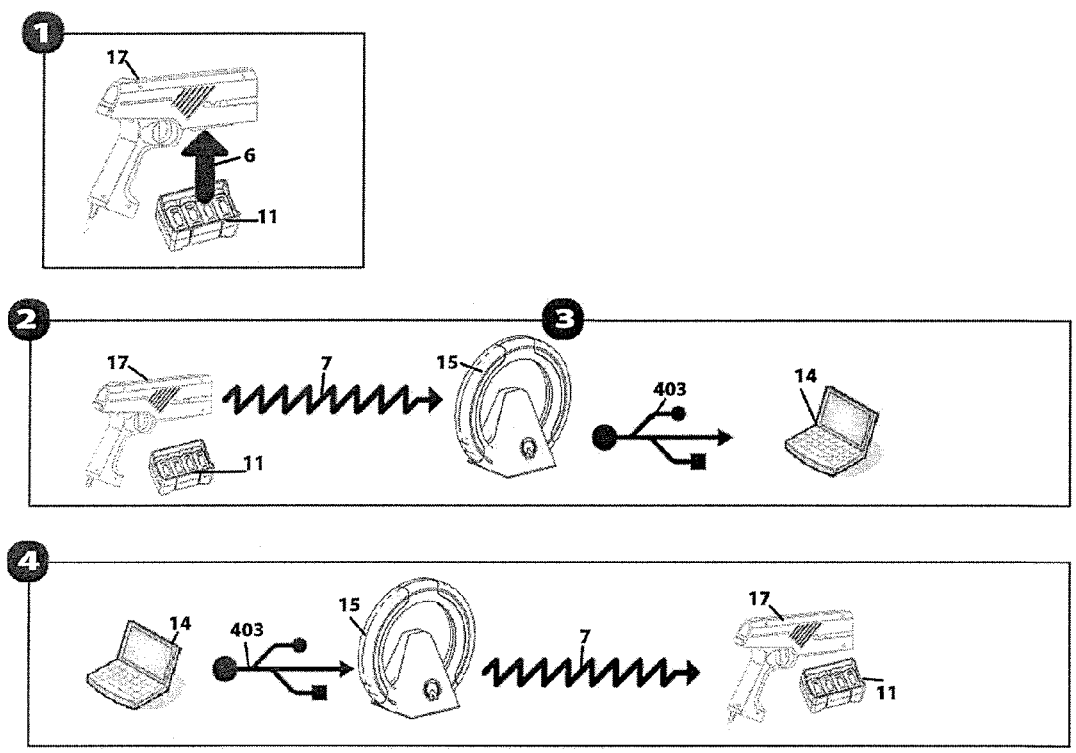
FIG. 24 is a schematic diagram illustrating an embodiment of an action protocol of an RFID system having features and advantages in accordance with the present disclosure.
Figure 25:
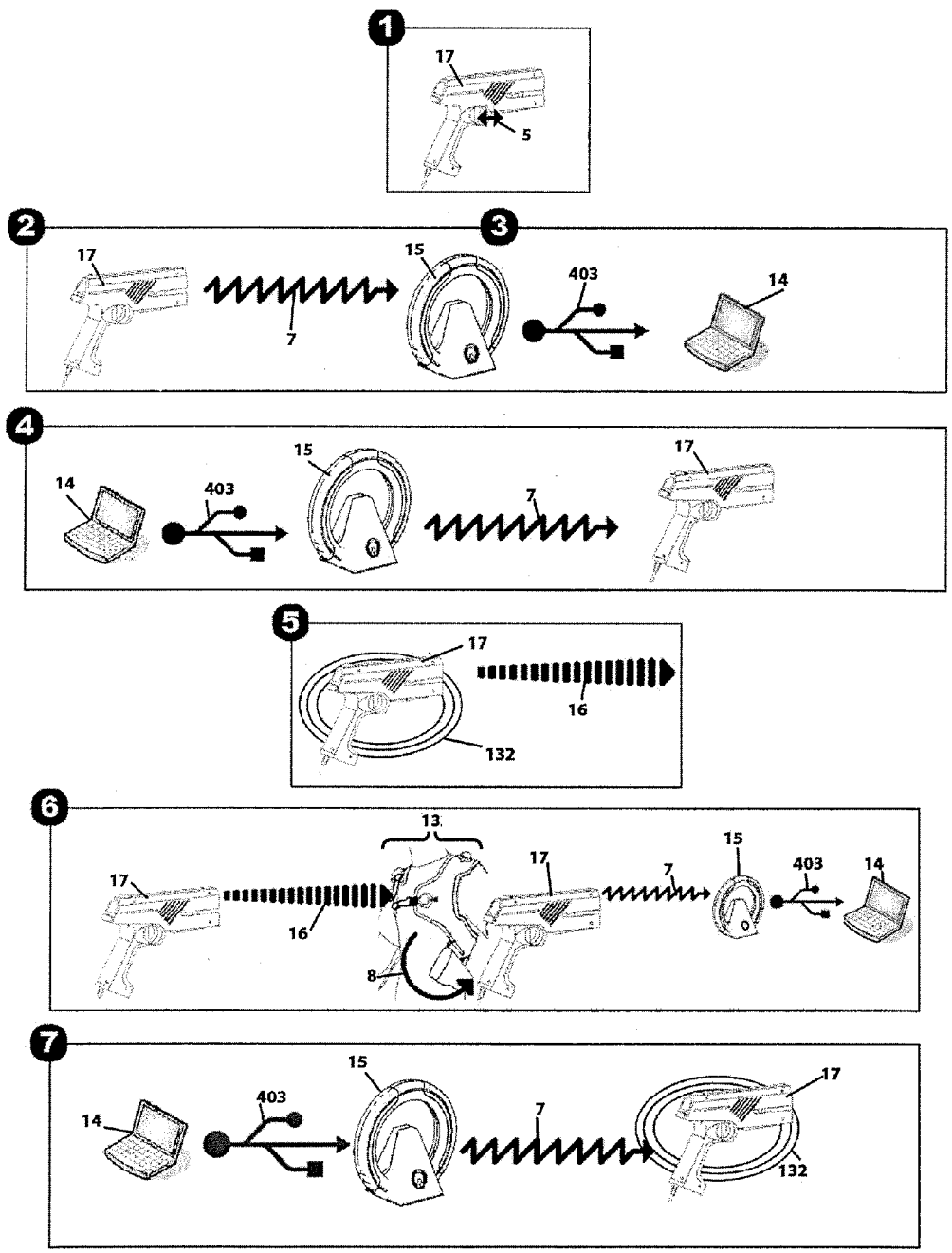
FIG. 25 is a schematic diagram illustrating an embodiment of an interaction protocol and actions of a system having features and advantages in accordance with the present disclosure.

Exemplary embodiments of the game system 1 managed by the computer manager system 14 showing protocol or sequence steps are depicted in FIGS. 24 and 25. FIG. 24 shows the interaction protocol between the transponder 17 and computer manager system 14, relayed through the transceiver 15, when the transponder 17 scans RFID-tagged goal-oriented objects such as an RFID Ammo box, life points, medical kits, flags, treasure chests, or other objects, during game play. Specifically, information in the form of wireless communications such as an RF signal 7 is transmitted from the transponder to the transceiver 15, which translates the RE signal 7 into a command (information package sent via USB 403 to the computer manager 14. In response, the computer manager 14 determines whether the transponder's scanning 6 falls within pre-determined guidelines, i.e., what type of RFID object is being scanned and whether that object is an allowable target for the transponder in question. Here the transponder 17 scans the ammunition box 11*a*. The transponder's HUD 120 may indicate a message such as "scan pushed" to the player. The computer manager 14 sends a command (information package) via USB 403 to the transceiver 15, which translates the data into an RE signal 7, which is received by the transponder 17, having a result. If the scanning action of the transponder 17 meets with success as determined by the computer manager system 14, the transponder 17 may be provided with additional ammunition, or life points, or credit for the capture of a goal-oriented-object 12. A change in status as a result of this activity is visible on the HUD 120 transponder 17 and a confirmation sound may be played.

FIG. 25 depicts an exemplary interaction protocol and actions executed while playing a game where the protocol is a non-standard communication format and language that governs the transmitting and receiving of data. A protocol may define the packet structure of the data transmitted or the control commands that manage the session, or both. There are two main modes for interaction: the "manual mode" and the "automatic mode".

In the manual mode, the transponder 17 itself does not make any decisions about what it knows or does not know relating to the game. Every input of information is sent from the transponder to the computer manager system 14 through the transceiver 15 with Radio Frequency communication 7. Then the computer manager system, according to the current played game, sends back commands to the transponder 17 to trigger outputs.

In the automatic mode, depending on the current game, a small piece of code is sent to the computer manager system 14 at the beginning of the game. This mode is meant to reduce the load on the transponder in terms of battery consumption and Radio Frequency transmission. The piece of code that is sent to the computer manager is a program that tells the transponder 17 how to react to certain inputs, what data it should manage on its own and what information it is to send to the computer manager system through Radio Frequency. For example, in a death match game in which the player has pressed the trigger 5, as shown in Box 1, the transponder 17, with the help of the sent code, checks if it has enough ammunition through the sequence of action depicted in FIG. 25 Boxes 2,3, 4 and 5. Transponder 17 sends an RF signal 7 to the transceiver 15 which relays the command (information package) to the USB 403 linked Computer Manager 14. The code running on the Computer manager system 14 analyzes whether or not the transponder has enough ammunition by checking the amount of ammunition the player has remaining. If the player has ammunition remaining, the Computer manager sends a command through USB 403 via the transceiver 15 and RF signal 7 to the transponder 17 allowing the gun to fire an infrared beam 16, playa shot sound, display on the HUD the amount of ammunition left and then send just one Radio Frequency message to the computer manager system via the transceiver, as shown in Box 2, saying, it has fired. If the player who shoots the beam hits another player as shown in Box 6, the receptor system 13 of the shot player sends an electrical signal 8 to the transponder 17 which relays the command (information package) through an RF signal 7, via the transceiver 15 and then through USB 403 to the computer manager system 14 telling by which player it has been hit. The computer manager system then subtracts a life point from the shot player, adjusts the score board by adding one hit point to the player that successfully shot the other player and sends a signal to the shot player's transponder 17 via the USB 403 and the transceiver 15 telling the shot player's transponder to vibrate 132 and subsequently displays one less life point on the HUD while playing a shot sound.

Interactive accessories that are made of plastic or other suitable material can also be deployed during game play to further enhance/vary the game play experience. Exemplary embodiments of interactive accessories include but are not limited to one or more of a bomb (FIG. 26), a grenade (FIG. 27), a set of multiple targets or a target system (FIG. 28), a zone protector or movement detector (FIG. 29), a can (FIG. 30) and/or a mini ammunition clip (FIG. 31).

Figure 26:
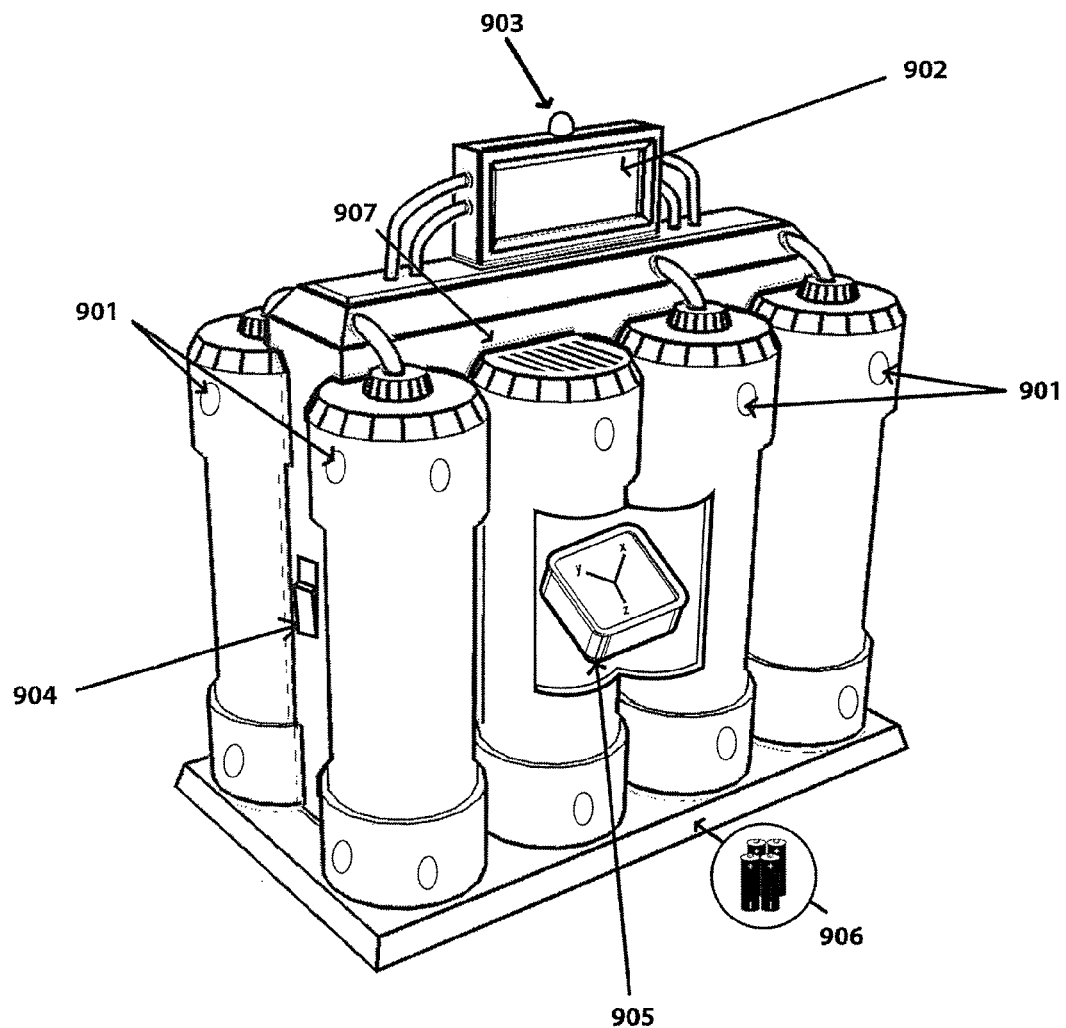
FIG. 26 is a perspective view of an embodiment of an interactive accessory having features and advantages in accordance with the present disclosure.

FIG. 26 illustrates an interactive accessory that is in the form of a beacon or time bomb which is comprised of Infrared emitters 901, infrared receptors 903, an LED 902 that flashes, an on/off switch to defuse/activate the bomb 904, an accelerometer that is inside the device 905 along with an RFID tag, a battery pack 906 on the bottom of the device, an RF emitter, and a speaker 907. The beacon or time bomb may be launched by players during gameplay. When the interactive accessory is activated, it sends a 360 degree infrared signal towards any player or group of players inside an area of a 50*m* radius. Any player that is within range of the bomb is hit by the explosion and his or her receptor will react to the infrared signal sent from the bomb when hit, by displaying flashing LED light(s) that are coupled to the receptor. The beacon bomb could also be used in a game play where the object of the game is to defuse the bomb before it goes off. In this example, the beacon bomb could be hidden in a play environment and set to explode in a particular amount of time, the player or players would then have to find the beacon bomb and fire their transponder at it and/or switch the bomb off using either the transponder's RFID reader, an RF signal, or both to scan the bomb either through direct contact or from a distance of approximately 10 cm and/or switch the bomb off using a button 904 in order to defuse the bomb before it explodes. If they are too late, the beacon bomb sends out an RF signal relayed to the transceiver first and then to every players' transponders participating in the game.

Figure 27:
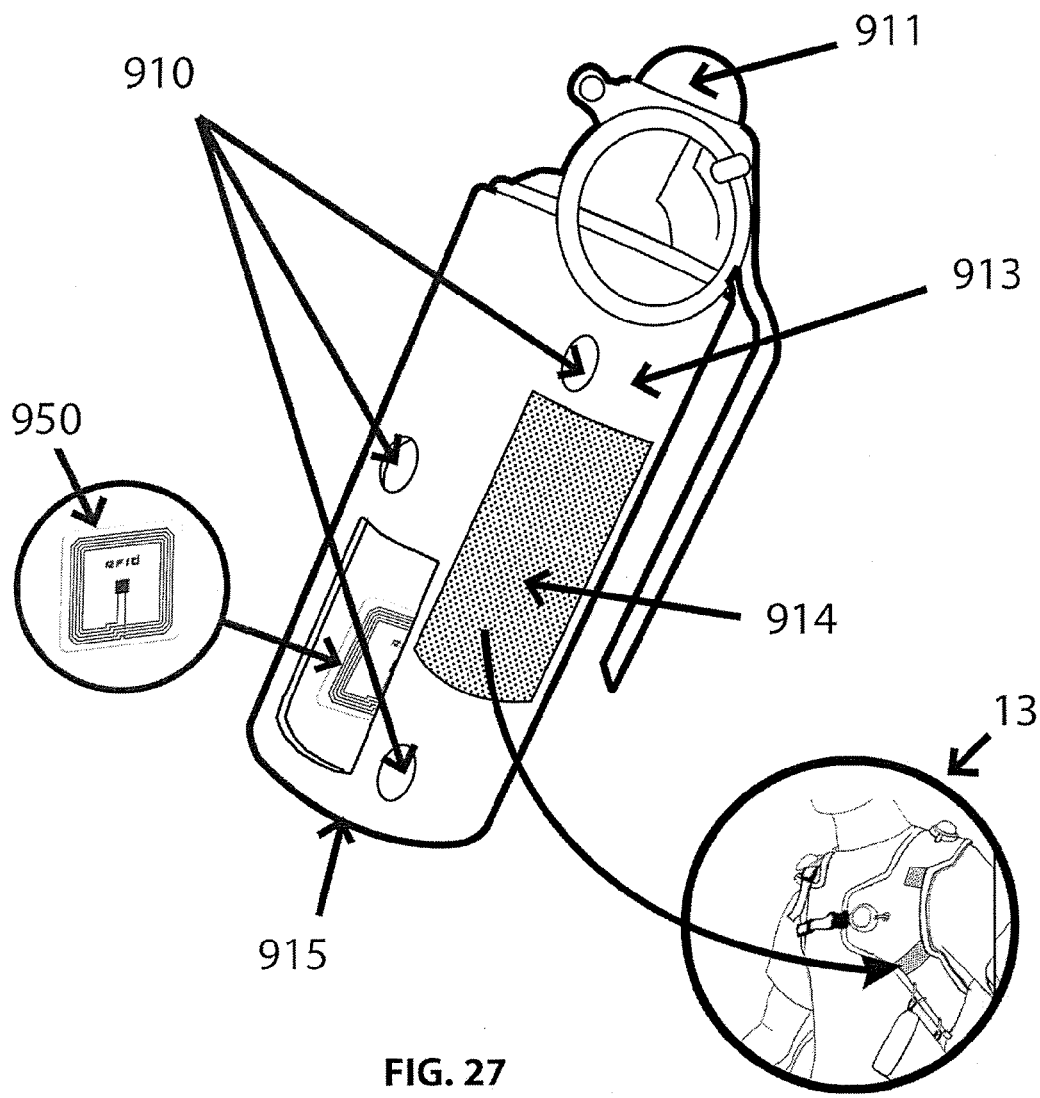
FIG. 27 is a perspective view of an embodiment of an interactive accessory having features and advantages in accordance with the present disclosure.

FIG. 27 depicts an interactive accessory that is in the form of a grenade which comprises an on/off switch 912, a battery pack 915 powering the Infrared emitter 910 and an infrared sensor 911. An RFID tag 913 may be placed inside of the grenade and could be scanned by the RFID scanner on the transponder either through direct contact or from a distance of approximately 10 cm. The grenade may be held by a patch of Velcro 914 on the player's harness.

Figure 28:
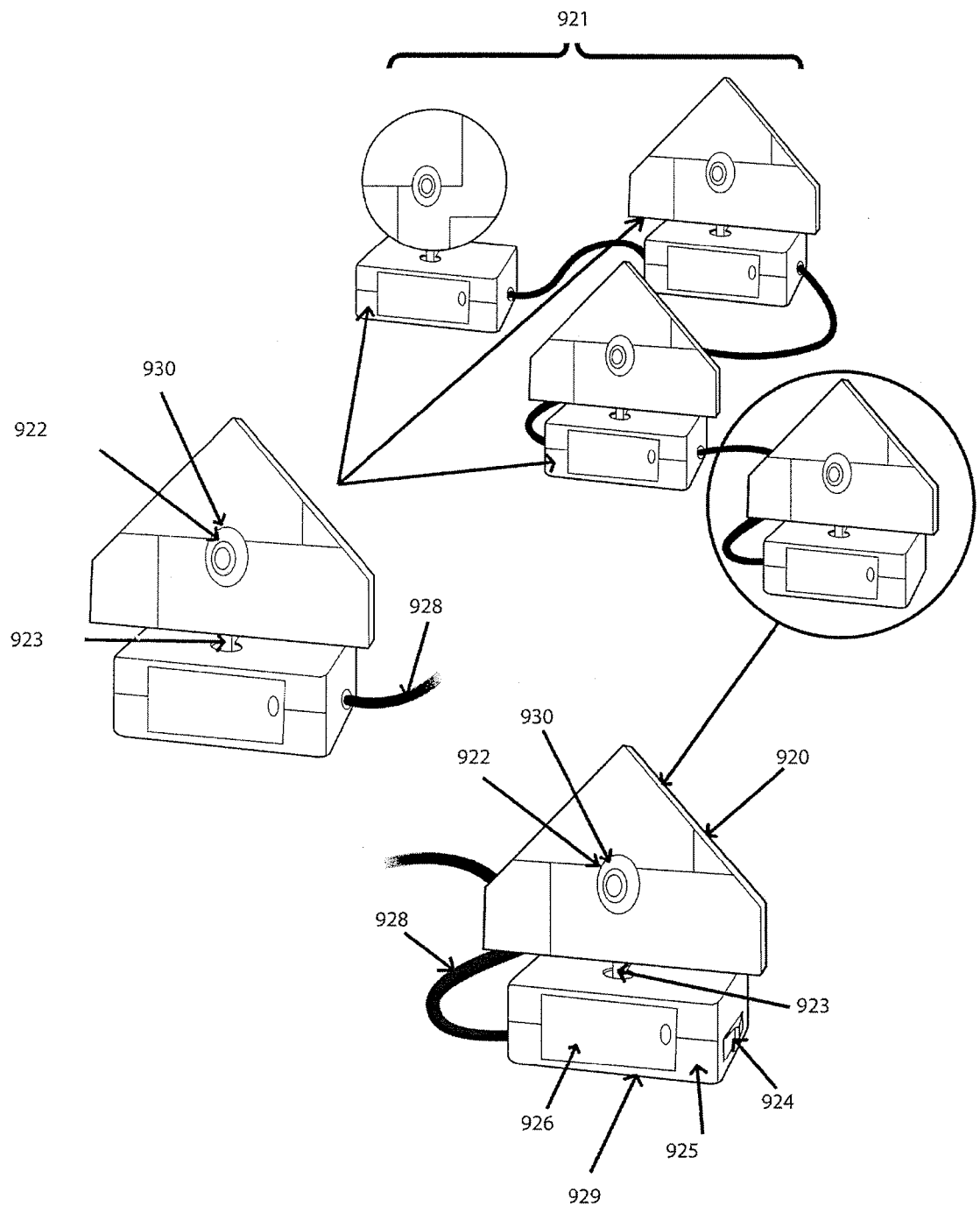
FIG. 28 is a perspective view of an embodiment of an interactive accessory having features and advantages in accordance with the present disclosure.

FIG. 28 illustrates an interactive accessory in the form of a target system comprising a master target 920 and 3 (three) slave targets 921. Inside the master target there is a battery pack 926, with a Radio Frequency emitter 925. The master target also includes an on/off switch 924, a chipset to control communication and functions 929, and in the middle of the target an Infrared receptor 922 as well as an LED 930 that illuminates when the target is hit. The three slave targets are all connected by a wire 928 as well as to the master target 920. There is a DC motor (not shown) that enables the targets to retract when tired upon. The target system could be used to practice alone and/or with other players for example as a stand alone target system coupled with a transponder, or it could be used during game play as part of the game play objectives.

Figure 29:
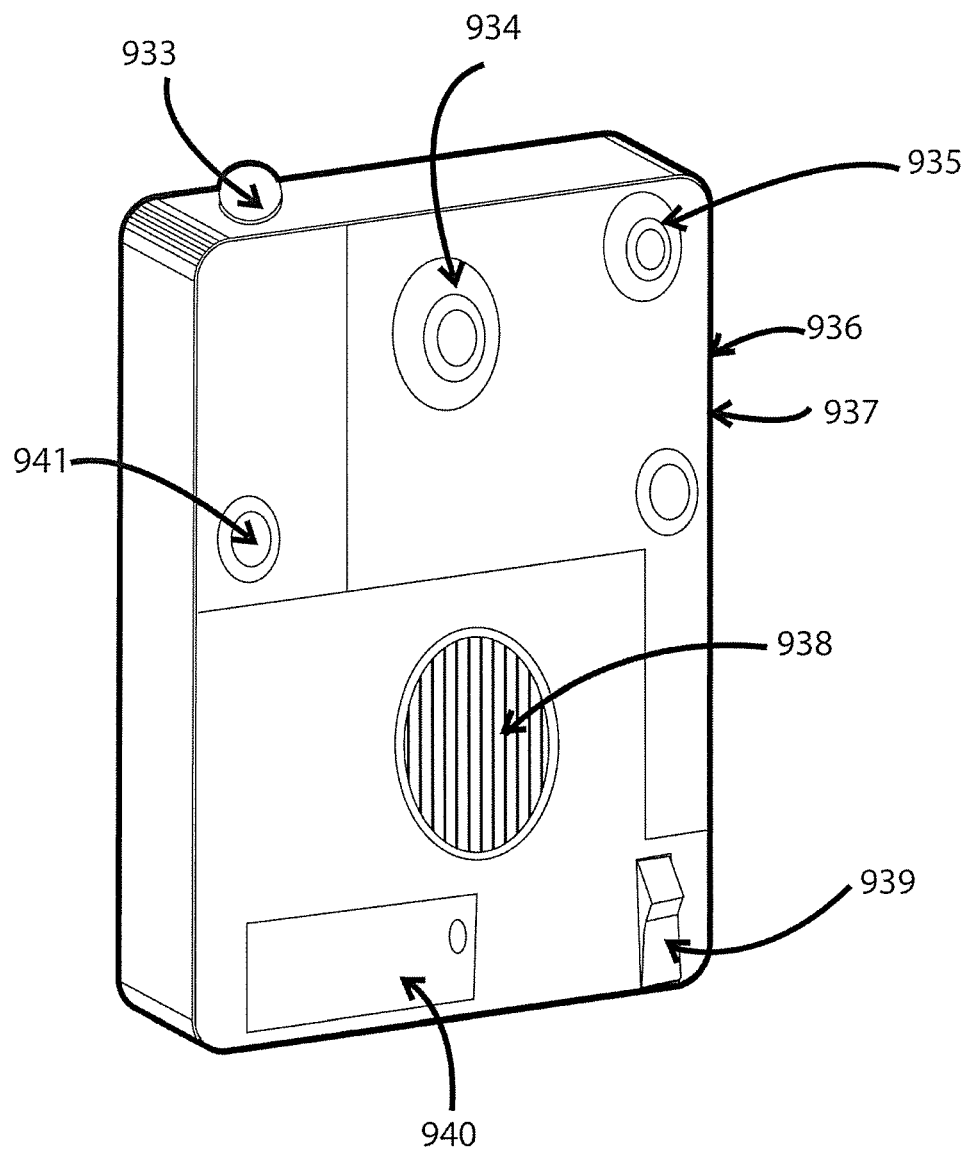
FIG. 29 is a perspective view of an embodiment of an interactive accessory having features and advantages in accordance with the present disclosure.

FIG. 29 illustrates an interactive accessory in the form of a zone protector or movement detector. It comprises of a Flashing LED 933, various IR emitters 941, infrared receptors 934, a PIR (Infrared Red Passive receptor) detector 935, A Radio Frequency emitter 936, a chipset 937, an on/off switch button 939, and a battery pack 940. It could be used as a zone protector during a game that consists of various zones. Each player's or team's zone could contain a goal-oriented object such as a flag or treasure or other valuable item that the player or team is trying to protect. The zone protector accessory could be used to monitor movement in the zone containing the valuable item so the player or players would be alerted on their transponder(s) to something moving in the protected area. It could also be used to defuse a bomb that could be deactivated when fired upon by the transponder.

Figure 30:
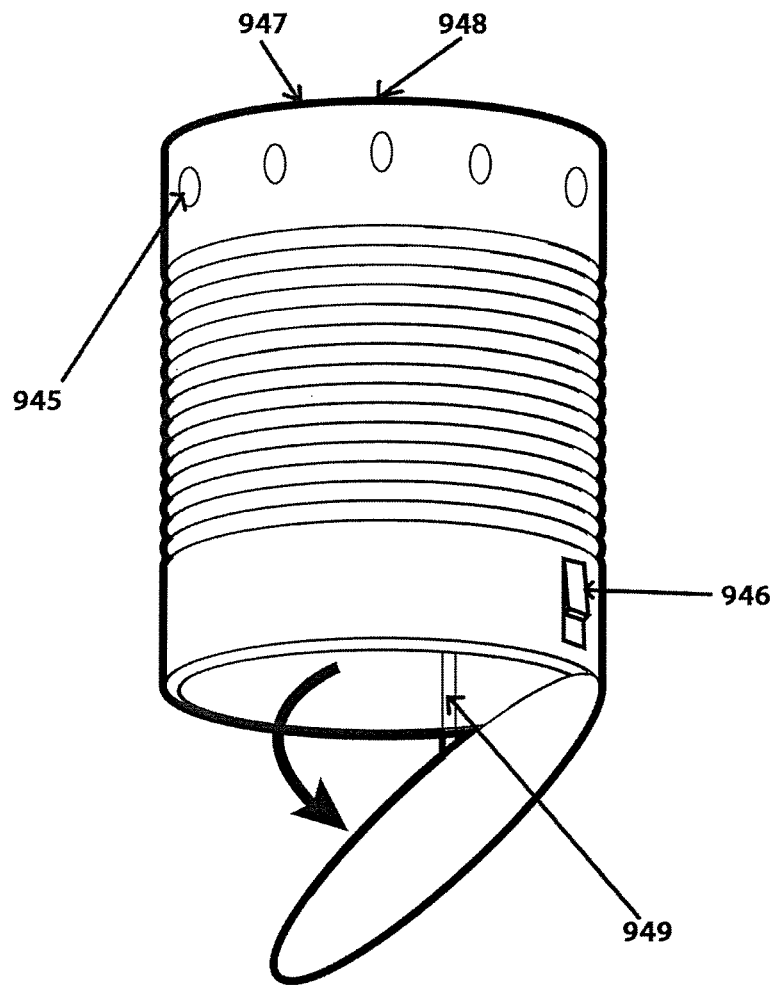
FIG. 30 is a perspective view of an embodiment of an interactive accessory having features and advantages in accordance with the present disclosure.
Figure 31:
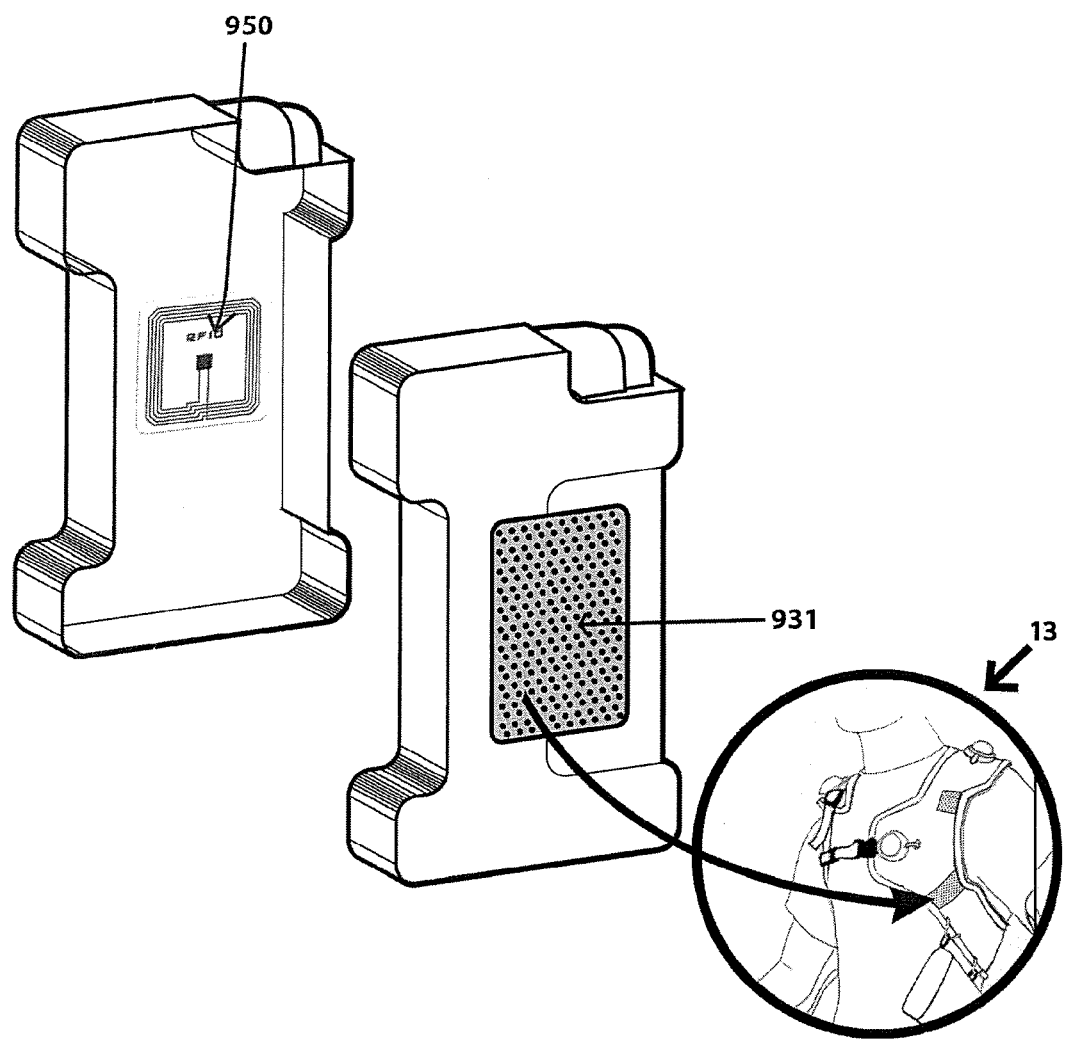
FIG. 31 is a perspective view of an embodiment of an interactive accessory having features and advantages in accordance with the present disclosure.

FIG. 30 depicts the an interactive accessory in the form of a Can which comprises infrared receptors 945, an on/off switch 946, a battery pack 948 and a DC motor 947 inside of the Can. It could be used during game play or as a stand alone device for target or shooting practice by one or more players.

FIG. 31 depicts an interactive accessory in the form of a mini ammunition clip used to reload ammunition during game play. It comprises an RFID tag 950 inside of the mini ammunition clip that could be activated by the RFID scanner on the transponder either through direct contact or from a distance of approximately 10 cm. The mini ammunition clip also includes a velcro patch to position it on the player's harness 334 as seen on FIG. 13.

Games that can be played on the system include, but are not limited to, laser-tag, capture the flag, kill shot, death match, sword fighting, cops and robbers, cowboys and Indians, pirate games, war games or sports games, or games such as "Run forest", "Alien Invasion", "Cocoon", "Call of tentacles", "Old fashion Duel", "Round of the Death", "Sport Parts", "Galactic Post Service", "The Last Bunker", "The Alien Virus", "The General", "In the Name of the Law", "Rustlers", "Fragmatch", "Free Frag", "Free for All", "Team Frag", "Liquidator", "Last Man Standing", "Vampire War", "Space Mercenaries", "Score Attack", "Biathlon", "Relay Race", "Place and Tag", "Triathlon", "Simon Says", "Lottery", "Gold Rush", "Hide and Seek", that can be played indoors or outdoors button 904 in order to defuse While embodiments of the disclosure have been described above, it will be apparent to one skilled in the art that various changes and modifications may be made. It should be understood that any of the foregoing configurations and specialized components may be interchangeably used with any of the systems of the preceding embodiments. Although illustrative embodiments of the present disclosure are described hereinabove, it will be evident to one skilled in the art that various changes and modifications may be made therein without departing from the disclosure. It is intended in the appended claims to cover all such changes and modifications that fall within the true spirit and scope of the disclosure.

The invention claimed is:

1. A game system comprising:
   a computer manager system adapted to manage gaming activities of one or more players;
   a transceiver in operative communication with the computer manager system; and
   one or more transponder/receptor units in operative communication with the transceiver, each transponder/receptor unit including a transponder and a receptor, each transponder/receptor unit including a display light indicating when a first player has been hit by second player firing a transponder/receiver unit, wherein a first transponder can communicate with a second transponder at a distance of at least about 80 meters without using the transceiver;
   wherein the transceiver is adapted to enable wireless communication between a transponder/receptor unit and the computer manager system over distances of at least about 250 meters in an indoor environment and at least about 750 meters in an outdoor environment.

2. The game system of claim 1 wherein the computer manager system manages the gaming activities of the one or more players in real time.

3. The game system of claim 2 wherein the computer manager system acts as one or more of: a master of the game and a referee of the game.

4. The game system of claim 1 further comprising one or more goal-oriented objects, each goal-oriented object including a unique identifier and adapted for wireless communication with the one or more transponders.

5. A method of playing a game for one or more players, said method comprising the steps of:
   sending a signal from a transceiver to a computer manager system coupled to said transceiver;
   receiving signals in a separate transponder/receptor unit used by each player;
   providing a visible indication when a first player has been hit by second player firing a transponder/receptor unit, wherein a first transponder/receptor unit can communicate with a second transponder/receptor unit at a distance of at least about 80 meters without using the transceiver;
   controlling the activity of said one or more players through the computer manager system by controlling the activity of each of said one or more players' transponder/receptor units during the game play, thereby serving as one of a master of the game and as a referee of the game; and
   wherein the computer manager system provides communication over distances of at least about 250 meters in an indoor environment and at least about 750 meters in an outdoor environment.

6. The method of claim 5 wherein said transceiver is coupled to the computer manager system via a USB link.

7. The method of claim 5 wherein the computer manager system is one of: a personal computer, a computer gaming platform, home game console, arcade game console, handheld game device, internet gaming device, a cell phone, a television set, and a set top box.

8. The method of claim 5 wherein the transceiver comprises one or more of: an LED infrared receptor, a Radio Frequency emitter consisting of a PCB antenna, a PCB with a control circuit and a USB wire.

9. The method of claim 5, wherein each transponder/receptor unit comprises:
   a transponder including an RF emitter, an infrared emitter and an RFID reader; and
   a receptor unit having one or more infrared receptor centers including one or more lights.

10. The method of claim 5, further comprising one or more goal-oriented objects adapted for wireless communication with the one or more transponders.

11. The method of claim 10 wherein the one or more goal-oriented objects comprises a unique identifier.

* * * * *